United States Patent
Grieco et al.

(10) Patent No.: US 11,896,938 B2
(45) Date of Patent: Feb. 13, 2024

(54) NANOBUBBLE DISPERSIONS GENERATED IN ELECTROCHEMICALLY ACTIVATED SOLUTIONS

(71) Applicant: Disruptive Oil and Gas Technologies Corp, Little River, SC (US)

(72) Inventors: Gary James Grieco, Little River, SC (US); David Lee Holcomb, Florence, AZ (US); Jeffery Kearns Hardin, Kennesaw, GA (US); Leonard Mark Bland, Deerfield, IL (US)

(73) Assignee: Disruptive Oil and Gas Technologies Corp, Little River, SC (US)

( * ) Notice: Subject to any disclaimer, the term of this patent is extended or adjusted under 35 U.S.C. 154(b) by 0 days.

(21) Appl. No.: 18/058,080

(22) Filed: Nov. 22, 2022

(65) Prior Publication Data
US 2023/0111628 A1    Apr. 13, 2023

Related U.S. Application Data

(63) Continuation of application No. 17/500,712, filed on Oct. 13, 2021, now abandoned.

(51) Int. Cl.
*C09K 8/58*    (2006.01)
*B01F 23/23*   (2022.01)
(Continued)

(52) U.S. Cl.
CPC ............... *B01F 23/23* (2022.01); *C09K 8/58* (2013.01); *C25B 1/16* (2013.01); *E21B 43/168* (2013.01); *B01F 23/2373* (2022.01)

(58) Field of Classification Search
CPC ......... C09K 8/58; C25B 1/16; B01F 23/2373; C01F 23/23
See application file for complete search history.

(56) References Cited

U.S. PATENT DOCUMENTS 1,249,232 A    12/1917  Squires
1,658,305 A     2/1928  Russell
(Continued)

FOREIGN PATENT DOCUMENTS

AU    2008266893 A1   12/2008
AU    2008323730 A2    6/2010
(Continued)

OTHER PUBLICATIONS

Hewage, S. A. et al., "Stability of Nanobubbles in Different Salts Solutions", Department of Civil & Environmental Engineering, New Jersey Institute of Technology, Newark, NJ, pp. 1-13 (Oct. 3, 2020).
"Hypochlorous Acid Nanotechnology", https://www.aquaox.com/wp-content/uploads/2019/03/Hypochlorous-Nanobubbles.pdf, (Jul. 19, 2014).
(Continued)

*Primary Examiner* — Alicia Bland
(74) *Attorney, Agent, or Firm* — Bond, Schoeneck & King, PLLC

(57) ABSTRACT

Methods and systems for treating a hydrocarbon-bearing formation are provided. A method includes providing a nanogas dispersion comprising a plurality of stable gas-filled cavities dispersed within an electrochemically activated ("ECA") aqueous solution, the ECA aqueous solution comprising an electrolyte and water; and introducing an effective amount of the nanogas dispersion into the hydrocarbon-bearing formation, wherein the plurality of stable gas-filled cavities of the nanogas dispersion enter into an interstitial space defined as between the hydrocarbon and the hydrocarbon-bearing formation thereby reducing interfacial tension between the hydrocarbon and the hydrocarbon-bearing formation. A system includes a pump configured to introduce the effective amount of the nanogas dispersion into the hydrocarbon-bearing formation; and a recovery device configured to collect the hydrocarbon from the hydrocarbon-bearing formation.

10 Claims, 9 Drawing Sheets

(51) Int. Cl.
*C25B 1/16* (2006.01)
*E21B 43/16* (2006.01)
*B01F 23/2373* (2022.01)

(56) References Cited

U.S. PATENT DOCUMENTS

| | | | |
|---|---|---|---|
| 2,262,428 A | 11/1941 | Tempelaar |
| 2,740,478 A | 4/1956 | Greene |
| 2,875,833 A | 3/1959 | Martin |
| 3,065,790 A | 11/1962 | Holm |
| 3,136,361 A | 6/1964 | Marx |
| 3,208,519 A | 9/1965 | Moore |
| 3,278,233 A | 10/1966 | George et al. |
| 3,451,477 A | 6/1969 | Kelley |
| 3,469,630 A | 9/1969 | Hurd et al. |
| 3,498,378 A | 3/1970 | Stone et al. |
| 3,530,937 A | 9/1970 | Bernard |
| 3,560,053 A | 2/1971 | Ortloff |
| 3,599,716 A | 8/1971 | Thompson |
| 3,617,152 A | 11/1971 | Cummings |
| 3,653,438 A | 4/1972 | Wagner |
| 3,748,828 A | 7/1973 | Lefebvre |
| 3,794,114 A | 2/1974 | Brandon |
| 3,915,234 A | 10/1975 | Pelofsky |
| 4,033,411 A | 7/1977 | Goins |
| 4,192,742 A | 3/1980 | Bernard et al. |
| 4,212,354 A | 7/1980 | Guinn |
| 4,249,232 A | 2/1981 | Dick |
| 4,658,305 A | 4/1987 | Tsushima |
| 4,788,020 A | 11/1988 | Yampolsky et al. |
| 5,129,457 A | 7/1992 | Sydansk |
| 5,403,473 A | 4/1995 | Moorehead et al. |
| 5,725,054 A | 3/1998 | Shayegi et al. |
| 6,105,672 A | 8/2000 | Deruyter et al. |
| 6,209,855 B1 | 4/2001 | Glassford |
| 6,656,366 B1 | 12/2003 | Fung et al. |
| 6,689,262 B2 | 2/2004 | Senkiw |
| 7,008,535 B1 | 3/2006 | Spears et al. |
| 7,059,591 B2 | 6/2006 | Bortkevitch et al. |
| 7,294,278 B2 | 11/2007 | Spears et al. |
| 7,537,200 B2 | 5/2009 | Glassford |
| 7,730,958 B2 | 6/2010 | Smith |
| 7,891,046 B2 | 2/2011 | Field et al. |
| 7,919,534 B2 | 4/2011 | Wood et al. |
| 8,002,038 B2 | 8/2011 | Wilson |
| 8,007,654 B2 | 8/2011 | Field et al. |
| 8,012,339 B2 | 9/2011 | Field |
| 8,012,340 B2 | 9/2011 | Field et al. |
| 8,016,996 B2 | 9/2011 | Field et al. |
| 8,025,786 B2 | 9/2011 | Field et al. |
| 8,046,867 B2 | 11/2011 | Field et al. |
| 8,137,703 B2 | 3/2012 | Chiba et al. |
| 8,236,147 B2 | 8/2012 | Field |
| 8,276,888 B2 | 10/2012 | Osborn et al. |
| 8,319,654 B2 | 11/2012 | Field et al. |
| 8,371,315 B2 | 2/2013 | Denison et al. |
| 8,500,104 B2 | 8/2013 | Spears et al. |
| 8,523,151 B2 | 9/2013 | Tsuji |
| 8,603,320 B2 | 12/2013 | Field |
| 8,678,354 B2 | 3/2014 | Kerfoot |
| 8,719,999 B2 | 5/2014 | Field |
| 8,919,747 B2 | 12/2014 | Anzai et al. |
| 8,959,991 B2 | 2/2015 | Pissarenko et al. |
| 9,061,323 B2 | 6/2015 | Field et al. |
| 9,133,700 B2 | 9/2015 | Lissianski et al. |
| 9,234,407 B2 | 1/2016 | Meyer |
| 9,284,653 B2 | 3/2016 | Nakamoto |
| 9,527,046 B1 | 12/2016 | Roe |
| 9,586,186 B2 | 3/2017 | Roe |
| 9,700,190 B2 | 7/2017 | Field |
| 9,949,463 B2 | 4/2018 | Nakamoto |
| 10,022,681 B2 | 7/2018 | Spears et al. |
| 10,053,966 B2 | 8/2018 | Hardin et al. |
| 10,219,670 B2 | 3/2019 | Citsay |
| 10,500,553 B2 | 12/2019 | Kamimura et al. |
| 10,676,663 B2 | 6/2020 | Breedlove et al. |
| 10,801,310 B2 | 10/2020 | Watts et al. |
| 10,814,290 B2 | 10/2020 | Bauer |
| 10,870,794 B2 | 12/2020 | Holcomb et al. |
| 10,870,894 B2 | 12/2020 | O'Hara et al. |
| 10,885,497 B2 | 1/2021 | Paris |
| 10,934,478 B2 | 3/2021 | Southwell et al. |
| 10,953,375 B2 | 3/2021 | Blevins et al. |
| 11,180,692 B2 | 11/2021 | Holcomb et al. |
| 11,193,359 B1 | 12/2021 | Hardin et al. |
| 11,219,872 B2 | 1/2022 | Roe |
| 11,253,822 B2 | 2/2022 | Spears et al. |
| 11,708,535 B2 | 7/2023 | Roe |
| 2003/0037928 A1 | 2/2003 | Ramachandran et al. |
| 2007/0051513 A1 | 3/2007 | Heins |
| 2007/0143025 A1 | 6/2007 | Valdez et al. |
| 2008/0061006 A1 | 3/2008 | Kerfoot |
| 2008/0236398 A1 | 10/2008 | Zhang et al. |
| 2008/0237141 A1 | 10/2008 | Kerfoot |
| 2009/0120460 A1 | 5/2009 | Hekman et al. |
| 2009/0172891 A1 | 7/2009 | Luckman et al. |
| 2009/0188721 A1* | 7/2009 | Smith ............ C09K 8/38 175/66 |
| 2009/0194280 A1 | 8/2009 | Gil et al. |
| 2009/0202304 A1 | 8/2009 | Koide et al. |
| 2009/0234225 A1 | 9/2009 | Martin et al. |
| 2010/0012331 A1 | 1/2010 | Larter et al. |
| 2010/0089419 A1 | 4/2010 | Field et al. |
| 2011/0017456 A1 | 1/2011 | Koide et al. |
| 2011/0048959 A1 | 3/2011 | Field |
| 2011/0100632 A1 | 5/2011 | Dinariev et al. |
| 2011/0121110 A1 | 5/2011 | Field |
| 2011/0127682 A1 | 6/2011 | Burns et al. |
| 2012/0067738 A1 | 3/2012 | Field |
| 2012/0228404 A1 | 9/2012 | Richardson |
| 2013/0014952 A1* | 1/2013 | Hopkins ............ E21B 43/26 166/305.1 |
| 2013/0092626 A1 | 4/2013 | Zimmerman et al. |
| 2013/0118977 A1 | 5/2013 | Eppink et al. |
| 2013/0199774 A1 | 8/2013 | Sultenfuss et al. |
| 2013/0233782 A1 | 9/2013 | Eppink et al. |
| 2013/0312980 A1 | 11/2013 | Stoisits et al. |
| 2013/0341012 A1 | 12/2013 | Belani et al. |
| 2014/0000357 A1 | 1/2014 | Pissarenko et al. |
| 2014/0035173 A1 | 2/2014 | Spears et al. |
| 2014/0041867 A1 | 2/2014 | Belgrave |
| 2014/0048494 A1 | 2/2014 | Simmons |
| 2014/0113841 A1 | 4/2014 | Shirley et al. |
| 2014/0116889 A1 | 5/2014 | Nakamoto |
| 2014/0124377 A1 | 5/2014 | Joynt |
| 2014/0158631 A1 | 6/2014 | Govind et al. |
| 2015/0089753 A1 | 4/2015 | Field |
| 2015/0158055 A1 | 6/2015 | Kirkpatrick |
| 2015/0300157 A1 | 10/2015 | Belani et al. |
| 2016/0029602 A1 | 2/2016 | Nakamoto |
| 2016/0040518 A1* | 2/2016 | Potapenko ............ E21B 43/162 166/305.1 |
| 2016/0054729 A1 | 2/2016 | Payette et al. |
| 2016/0066760 A1 | 3/2016 | Citsay |
| 2016/0289571 A1 | 10/2016 | Storey et al. |
| 2017/0051588 A1 | 2/2017 | Elmer |
| 2017/0260067 A1 | 9/2017 | Hopkins et al. |
| 2018/0073336 A1 | 3/2018 | Hardin et al. |
| 2018/0305604 A1 | 10/2018 | Breedlove et al. |
| 2018/0326368 A1 | 11/2018 | Roe et al. |
| 2019/0093463 A1 | 3/2019 | Hardin et al. |
| 2020/0196818 A1 | 6/2020 | Verhasselt |
| 2020/0216315 A1 | 7/2020 | Hardin et al. |
| 2021/0046401 A1 | 2/2021 | Folds et al. |
| 2021/0062077 A1 | 3/2021 | Holcomb et al. |
| 2023/0348795 A1 | 11/2023 | Roe |

FOREIGN PATENT DOCUMENTS

| | | |
|---|---|---|
| AU | 2013101750 A4 | 4/2016 |
| BR | 0707585 A2 | 5/2011 |

(56) References Cited

FOREIGN PATENT DOCUMENTS

| | | |
|---|---|---|
| BR | 0707717 A2 | 5/2011 |
| CN | 203948078 | 11/2014 |
| CN | 103189149 B | 6/2016 |
| CN | 106382106 B | 2/2019 |
| EP | 1991371 B1 | 6/2011 |
| EP | 2389470 A1 | 11/2011 |
| EP | 1984124 B1 | 8/2012 |
| EP | 1993743 B1 | 4/2016 |
| EP | 3188849 A2 | 7/2017 |
| JP | 2013010758 A | 1/2013 |
| JP | 5544181 B2 | 7/2014 |
| JP | 2016078010 A | 5/2016 |
| JP | 2017500136 A | 1/2017 |
| JP | 6333263 B2 | 5/2018 |
| KR | 100892529 B1 | 4/2009 |
| KR | 20110116131 A | 10/2011 |
| KR | 102215906 B1 | 2/2021 |
| WO | 1992002708 A1 | 2/1992 |
| WO | 2009046279 A2 | 4/2009 |
| WO | 2010024965 A1 | 3/2010 |
| WO | 2013126725 A1 | 8/2013 |
| WO | 2014075191 A1 | 5/2014 |
| WO | 2015168608 A1 | 11/2015 |
| WO | 2017201020 A1 | 11/2017 |
| WO | 2018128154 A1 | 7/2018 |
| WO | 2021183112 A1 | 9/2021 |

OTHER PUBLICATIONS

"Ec-H2O® Nanoclean Electrically Converted Water," https://www.tennantco.com/content/dam/tennant/tennantco/products/Innovations/ec-h2o-nanoclean-brochure-tennant-en-noam.pdf, (Nov. 2017).

Meegoda, J.N. et al., "Stability of Nanobubbles", Environmental Engineering Science, vol. 35, No. 11, pp. 1216-1230 (Nov. 11, 2018).

Zhang, H. et al., "Enhanced Oil Recovery (EOR) Using Nanoparticle Dispersions: Underlying Mechanism and Imbibition Experiments," Energy & Fuels, 28, 5, pp. 3002-3009 (Apr. 14, 2014).

Ali, Jagar A. et al., "Recent advances in application of nanotechnology in chemical enhanced oil recovery: Effects of nanoparticles on wettability alteration, interfacial tension reduction, and flooding", Egyptian Journal of Petroleum, vol. 27, pp. 1371-1383 (Nov. 9, 2018).

"Ultra-Fine Bubbles", Technology, UFB Eco Tech, https://ufbecotech.com/technology (2018).

"Ultra-Fine Bubble", http://supernanobubble.com/ultrafinebubble/ (2020).

Kikuchi, Kenji, et al., "Concentration Determination of Oxygen Nanobubbles in Electrolyzed Water," Journal of Colloid and Interface Science, vol. 329, Issue 2, pp. 306-309 (Jan. 15, 2009).

The International Search Report and the Written Opinion of the International Searching Authority, PCT Application No. PCT/US2017/032862, pp. 1-9, dated Aug. 7, 2017.

The International Search Report and the Written Opinion of the International Searching Authority, PCT Application No. PCT/US2022/078057, pp. 1-15, dated Jan. 26, 2023.

* cited by examiner

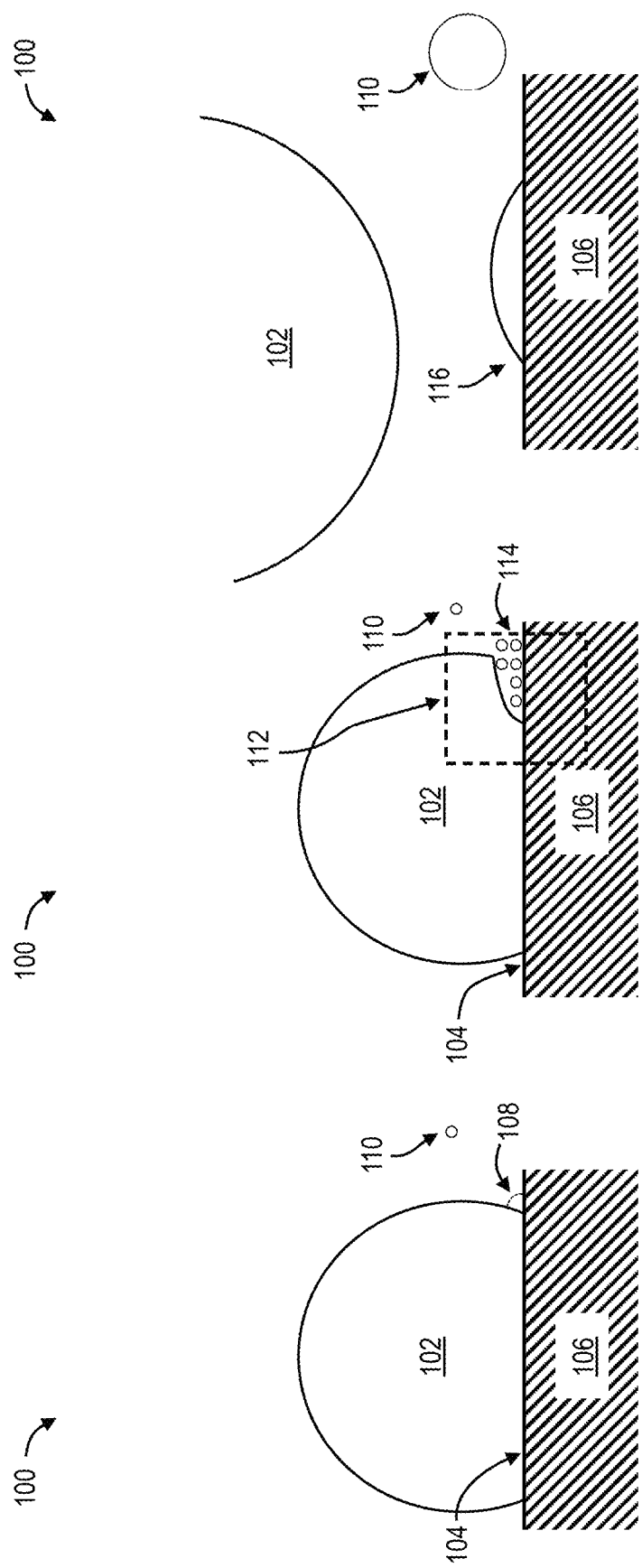

NANOBUBBLE DISPERSIONS GENERATED IN ELECTROCHEMICALLY ACTIVATED SOLUTIONS

CROSS-REFERENCE TO RELATED APPLICATIONS

This application claims priority to U.S. patent application Ser. No. 17/500,712 filed Oct. 13, 2021, and entitled "Nanobubble Dispersions Generated in Electrochemically Activated Solutions", the entire disclosure of which is incorporated herein by reference.

FIELD OF THE DISCLOSURE

The present disclosure is directed generally to nanobubble dispersions, specifically to nanobubble dispersions within electrochemically activated solutions (i.e., nanogas dispersions), and, more specifically, to methods and systems for treating a hydrocarbon-bearing formation using nanobubble dispersions. The inventions described herein find particular application in the field of subterranean hydrocarbon recovery.

BACKGROUND

In the recovery of oil from a subterranean hydrocarbon-bearing formation, primary recovery methods that utilize the natural formation pressure to extract the oil often results in recovering only a portion of the oil in the formation. The remaining oil that cannot be extracted from the formation using primary recovery methods may be produced by improved or enhanced oil recovery ("EOR") methods. Improved oil recovery methods include secondary recovery methods such as waterflooding as well as tertiary methods that include the use of solvents, surfactants, carbon dioxide, steam, aqueous alkaline materials, and/or polymers. In waterflooding, recovery is limited because water is not the best solvent. The water tends to create a path of least resistance (i.e., channeling) and loses effectiveness as well as efficiency. The injected water may drive a portion of the oil in the formation to a well. However, oil that is not extracted from the formation may be trapped within pores in the formation by capillary action of water extending across the pore throats of the pores. As a result, a significant quantity of oil trapped in these portions of the formation may be left in the formation and not recovered by the waterflood.

After primary and secondary recovery, further oil can also be extracted (i.e., tertiary recovery) from the formation by injecting gases, such as, nitrogen, carbon dioxide, steam, methane, air, etc., individually or as a blend, into the formation to mix with and mobilize oil for production. However, the use of such gases or combinations of gases and chemicals, such as, polymers and surfactants, is cost prohibitive and can require high pressures and/or temperatures.

Accordingly, improved methods of recovering oil from hydrocarbon-bearing formations where oil may be unrecoverable using traditional means are desirable.

SUMMARY OF THE DISCLOSURE

The present disclosure is directed generally to inventive systems and methods for treating hydrocarbon-bearing formations. The inventive systems and methods achieve complementary benefits that exceed what would be expected from (i) water alone, (ii) saltwater alone, (iii) nanobubbles alone, or (iv) catholyte alone. Anolyte can be used in a subterranean formation or surface facility for bacterial mitigation (e.g., reducing or eliminating sulfate-reducing bacteria that produce hydrogen sulfide $H_2S$). Various embodiments and implementations herein are directed to improved systems and methods involving one or more nanogas dispersions that improve the ability of gas-filled cavities (also referred to as nanobubbles, nanoscopic bubbles, ultrafine bubbles, etc.) within the dispersion to displace a contact line between a hydrocarbon and a subterranean formation. Applicant has recognized and appreciated that gas-filled cavities or nanobubbles in combination with catholyte can be used to recover oil. Applicant has further recognized and appreciated that the nanogas dispersions described herein can be used as a low energy and low cost method of oil recovery. Applicant has also recognized and appreciated that the disclosed dispersions comprising ozone gas-filled cavities or nanobubbles and an anolyte provide complementary biocidal capabilities that not only kill the bacteria, but remediate existing $H_2S$ and iron sulfide.

According to a first aspect, a method for treating a hydrocarbon-bearing formation is provided. The method comprises providing a nanogas dispersion comprising a plurality of stable gas-filled cavities dispersed within an electrochemically activated ("ECA") aqueous solution, the ECA aqueous solution comprising an electrolyte and water. The method further includes introducing an effective amount of the nanogas dispersion into the hydrocarbon-bearing formation. The plurality of stable gas-filled cavities of the nanogas dispersion enter into an interstitial space defined as between the hydrocarbon and the hydrocarbon-bearing formation thereby reducing interfacial tension between the hydrocarbon and the hydrocarbon-bearing formation.

In example embodiments, the method further includes separating the hydrocarbon from the hydrocarbon-bearing formation and extracting the hydrocarbon from the hydrocarbon-bearing formation.

In example embodiments, the method further includes generating the plurality of stable gas-filled cavities using a pressurized system including: (i) a microporous membrane, (ii) a cavitation system, (iii) a sonication system, or (iv) a pressurized system including a liquid-gas saturation device having a flow path.

In example embodiments, the plurality of stable gas-filled cavities comprises providing at least one of carbon dioxide gas-filled cavities, nitrogen gas-filled cavities, oxygen gas-filled cavities, ozone gas-filled cavities, air-filled cavities, field gas-filled cavities, and methane gas-filled cavities or combinations thereof.

In example embodiments, the plurality of stable gas-filled cavities have an average diameter of less than 500 nm.

In example embodiments, one or more of the plurality of stable gas-filled cavities is defined by a tensile strength of at least $1.3\ N^{-1}$ for cavities as small or smaller than 150 nm.

In example embodiments, the electrolyte is at least one of sodium chloride, potassium chloride, and potassium carbonate, and when electrochemically activated, the electrolyte becomes at least one of sodium hydroxide, potassium hydroxide, and hypochlorous acid.

In example embodiments, the ECA aqueous solution is a catholyte or an anolyte.

In example embodiments, the method further includes the nanogas dispersion forming a wedge of stable gas-filled cavities that creates a disjoining pressure that displaces the hydrocarbon from the hydrocarbon-bearing formation.

In example embodiments, the method further includes fragmenting the hydrocarbon into a plurality of smaller hydrocarbon droplets to reduce a viscosity of the hydrocarbon enabling the hydrocarbon to flow from the hydrocarbon-bearing formation.

According to another aspect, an enhanced system for treating a hydrocarbon-bearing formation is provided. The system comprises a pump configured to introduce an effective amount of a nanogas dispersion into the hydrocarbon-bearing formation, the nanogas dispersion comprising a plurality of stable gas-filled cavities dispersed within an electrochemically activated ("ECA") aqueous solution, the ECA aqueous solution comprising an electrolyte and water; and a recovery device configured to collect a hydrocarbon from the hydrocarbon-bearing formation, wherein the hydrocarbon is collected from an interstitial space defined as between the hydrocarbon and the hydrocarbon-bearing formation after the plurality of stable gas-filled cavities of the nanogas dispersion enter into the interstitial space thereby reducing interfacial tension between the hydrocarbon and the hydrocarbon-bearing formation to separate the hydrocarbon from the hydrocarbon-bearing formation.

In example embodiments, the plurality of stable gas-filled cavities comprises at least one of carbon dioxide gas-filled cavities, nitrogen gas-filled cavities, oxygen gas-filled cavities, ozone gas-filled cavities, air-filled cavities, field gas-filled cavities, and methane gas-filled cavities or combinations thereof.

In example embodiments, the electrolyte is at least one of sodium chloride, potassium chloride, and potassium carbonate, and when electrochemically activated, the electrolyte becomes at least one of sodium hydroxide, potassium hydroxide, and hypochlorous acid.

In example embodiments, the ECA aqueous solution is a catholyte or an anolyte.

In example embodiments, the plurality of stable gas-filled cavities have an average diameter of less than 500 nm.

In example embodiments, one or more of the plurality of stable gas-filled cavities is defined by a tensile strength of at least 1.3 $N^{-1}$ for cavities as small or smaller than 150 nm.

In example embodiments, the plurality of stable gas-filled cavities of the nanogas dispersion are configured to form a wedge of stable gas-filled cavities along a surface of the hydrocarbon-bearing formation, and wherein the wedge is configured to create a disjoining pressure that separates the hydrocarbon from the hydrocarbon-bearing formation.

In example embodiments, the collected hydrocarbon comprises a plurality of fragmented finer hydrocarbon droplets and the collected hydrocarbon has a lowered viscosity enabling the collected hydrocarbon to flow from the hydrocarbon-bearing formation.

Still in example embodiments, at least one fragmented finer hydrocarbon droplet of the plurality of fragmented finer hydrocarbon droplets of the collected hydrocarbon comprises the nanogas dispersion on its surface to provide lubricity According to another aspect, a nanogas dispersion is provided. The nanogas dispersion comprises an electrochemically activated ("ECA") aqueous solution comprising an electrolyte and water. The nanogas dispersion also comprises a plurality of gas-filled cavities dispersed or otherwise distributed within the ECA aqueous solution.

In an example embodiment, one or more of the plurality of gas-filled cavities of the nanogas dispersion is substantially spherical.

In an example embodiment, one or more of the plurality of gas-filled cavities of the nanogas dispersion is a nanobubble. In example embodiments, the plurality of gas-filled cavities have an average diameter of less than 500 nm.

In an example embodiment, one or more of the plurality of gas-filled cavities of the nanogas dispersion have a half-life of at least 15 days in the nanogas dispersion (i.e., the gas-filled cavities are stable).

In example embodiments, the gas-filled cavities are at least one of functionalized gas-filled cavities, non-functionalized gas-filled cavities, and combinations thereof.

In example embodiments, the plurality of gas-filled cavities comprises at least one of carbon dioxide gas-filled cavities, nitrogen gas-filled cavities, oxygen gas-filled cavities, ozone gas-filled cavities, air-filled cavities, field (mixed) gas-filled cavities, and methane gas-filled cavities or combinations thereof.

In example embodiments, the electrolyte is at least one of sodium hydroxide, potassium hydroxide, and hypochlorous acid.

In an example embodiment, a concentration of the electrolyte in the ECA aqueous solution is from about 10 ppm to about 10,000 ppm.

In example embodiments, the ECA aqueous solution is one of an anolyte or a catholyte.

In example preferred embodiments, the plurality of gas-filled cavities comprise methane gas-filled cavities and the ECA aqueous solution is a catholyte.

In example preferred embodiments, the plurality of gas-filled cavities comprise nitrogen gas-filled cavities and the ECA aqueous solution is a catholyte.

In additional example preferred embodiments, the plurality of gas-filled cavities comprise carbon dioxide-filled cavities and the ECA aqueous solution is a catholyte.

In still additional example preferred embodiments, the plurality of gas-filled cavities comprise ozone gas-filled cavities and the ECA aqueous solution is an anolyte.

In an example embodiment, the ECA aqueous solution has an oxidation reduction potential ("ORP") that is greater than 0 mV.

In an example embodiment, the ECA aqueous solution has an oxidation reduction potential ("ORP") that is less than 0 mV. In example preferred embodiments, the ORP is less than −500 mV.

According to another aspect, an enhanced oil recovery system is provided. The oil recovery system comprises (i) a reservoir containing an electrochemically activated ("ECA") aqueous solution; (ii) a nanogas dispersion generator configured to generate a nanogas dispersion within the ECA aqueous solution, the nanogas dispersion comprising the ECA aqueous solution and a plurality of gas-filled cavities dispersed therein; and (iii) an injection pump connected to the reservoir and configured to pump an effective amount of the nanogas dispersion into a subterranean formation.

In an example embodiment, the nanogas dispersion that is pumped into the subterranean formation interacts with a target hydrocarbon material located in the subterranean formation to form a mixture comprising water and the target hydrocarbon material.

In an example embodiment, the oil recovery system further comprises a surface-located device configured to extract the mixture comprising the water and the target hydrocarbon material.

In example embodiments, the ECA aqueous solution comprises an electrolyte that is at least one of sodium hydroxide, potassium hydroxide, and hypochlorous acid.

In example embodiments, the plurality of gas-filled cavities comprises at least one of carbon dioxide gas-filled cavities, nitrogen gas-filled cavities, oxygen gas-filled cavities, ozone gas-filled cavities, air-filled cavities, field (mixed) gas-filled cavities, and methane gas-filled cavities or combinations thereof.

In example embodiments, the ECA aqueous solution has an oxidation reduction potential ("ORP") that is greater than 0 mV.

In example embodiments, the ECA aqueous solution has an oxidation reduction potential ("ORP") that is less than 0 mV. In example preferred embodiments, the ORP is less than −500 mV.

In example embodiments, the plurality of gas-filled cavities have an average diameter of less than about 500 nm.

In example embodiments, a concentration of the electrolyte in the ECA aqueous solution is from about 10 ppm to about 10,000 ppm.

According to a further aspect, a method for treating a subterranean formation is provided. The method comprises: (i) providing a first nanogas dispersion comprising a first electrochemically activated ("ECA") aqueous solution and a first plurality of gas-filled cavities dispersed within the first ECA aqueous solution, the first ECA solution comprising an electrolyte and water; (ii) pumping an effective amount of the first nanogas dispersion into the subterranean formation; and (iii) extracting a first mixture comprising water from the subterranean formation to a surface-located device.

In example embodiments, the subterranean formation contains a target hydrocarbon material and the nanogas dispersion enters an interstitial space between a target hydrocarbon material and the subterranean formation thereby reducing interfacial tension of the hydrocarbon to the subterranean formation.

In example embodiments, extracting the first mixture comprising water further comprises extracting the target hydrocarbon material from the subterranean formation.

In example embodiments, extracting the first mixture comprises extracting at least some of the first ECA aqueous solution or the first plurality of gas-filled cavities of the effective amount of the first nanogas dispersion.

In an example embodiment, the first ECA aqueous solution of the first nanogas dispersion is anolyte and the method further comprises providing a second nanogas dispersion comprising a second ECA aqueous solution and a second plurality of gas-filled cavities dispersed within the second ECA aqueous solution, the second ECA solution comprising an electrolyte and water; pumping an effective amount of the second nanogas dispersion into the subterranean formation; and extracting a second mixture comprising water from the subterranean formation to the surface-located device.

In an example embodiment, the second ECA aqueous solution of the second nanogas dispersion is catholyte.

In an example embodiment, the method comprises: (i) providing at least two nanogas dispersions, each nanogas dispersion comprising an ECA aqueous solution and a plurality of gas-filled cavities dispersed within the ECA aqueous solution; (ii) pumping an effective amount of a first nanogas dispersion of the at least two nanogas dispersions into the subterranean formation; (iii) extracting a first mixture comprising water from the subterranean formation; (iv) pumping an effective amount of a second nanogas dispersion of the at least two nanogas dispersions into the subterranean formation; and (v) extracting a second mixture comprising water from the subterranean formation.

In an example embodiment, the ECA aqueous solution of the first nanogas dispersion is anolyte and the ECA aqueous solution of the second nanogas dispersion is catholyte and the effective amount of the second nanogas dispersion is pumped into the subterranean formation after a period of time has elapsed since the effective amount of the first nanogas dispersion is pumped into the subterranean formation.

In an example embodiment, extracting the first mixture comprises extracting at least some of the ECA aqueous solution or the plurality of gas-filled cavities of the effective amount of the first nanogas dispersion.

In an example embodiment, extracting the second mixture comprises extracting at least some of the ECA aqueous solution or the plurality of gas-filled cavities of the effective amount of the second nanogas dispersion.

In an example embodiment, extracting the first and/or second mixture comprises extracting hydrocarbon material with the water.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 1a is a schematic depiction of hydrocarbon material such as a droplet adhered to a surface of a subterranean formation according to aspects of the present disclosure.

FIG. 1B is a schematic depiction of a plurality of gas-filled cavities (i.e., nanobubbles) of a nanogas dispersion separating the hydrocarbon material from the surface in FIG. 1a according to aspects of the present disclosure.

FIG. 1c is a schematic depiction of the hydrocarbon material displaced from the surface by the nanobubbles according to aspects of the present disclosure.

DETAILED DESCRIPTION

Figure 2A:
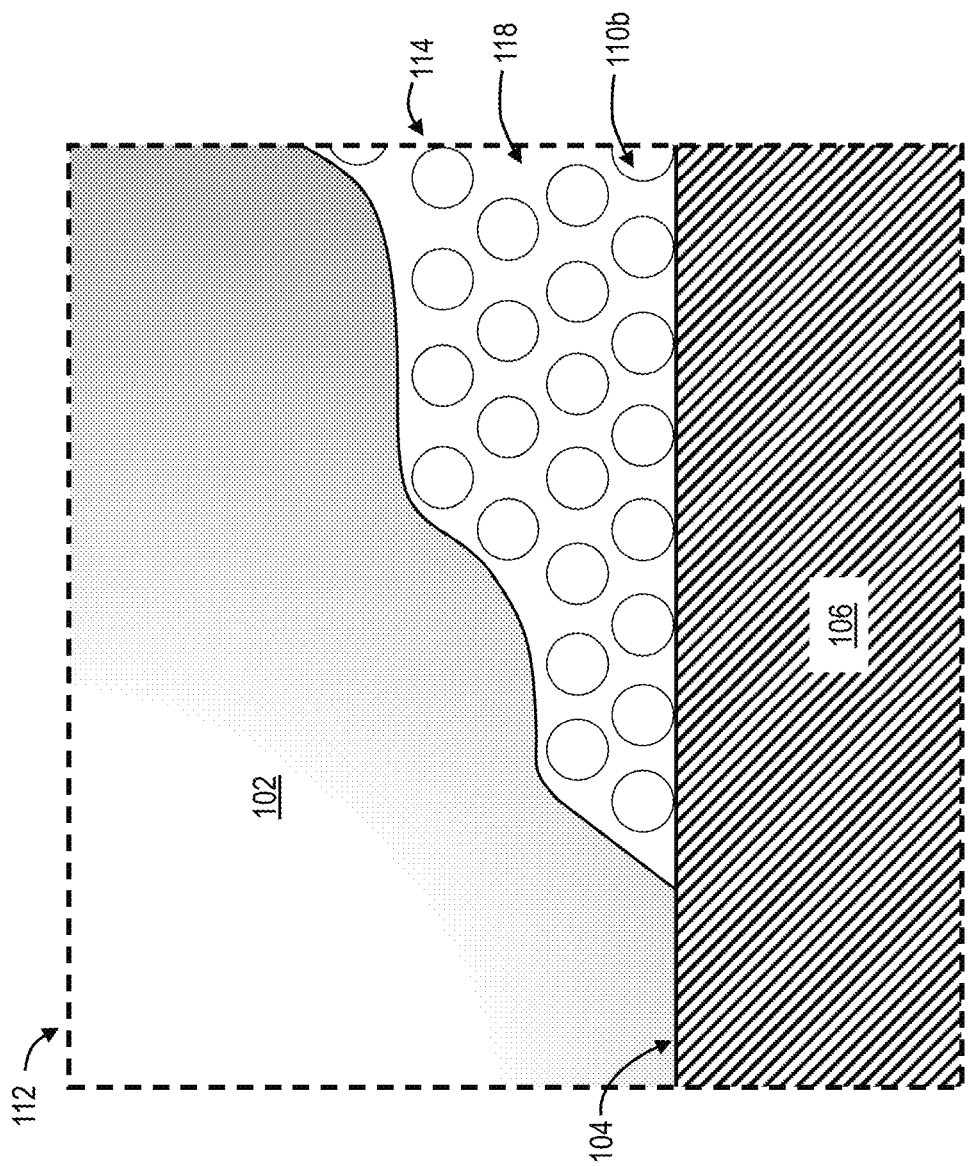
FIG. 2a illustrates an enlarged schematic representation of the enclosed portion in FIG. 1b showing the nanobubbles displacing the hydrocarbon material from the surface according to aspects of the present disclosure.

The present disclosure relates to the integration and/or infusion of gas-filled cavities or nanobubbles into a catholyte (e.g., sodium hydroxide, potassium hydroxide, or other ECA-derived bases) or an anolyte (e.g., hypochlorous acid and/or other hydroxy-radical blends) using electrochemical activation ("ECA") produced from aqueous brine solutions. Applicant has recognized and appreciated that the combination of such nanobubbles in ECA catholyte and/or anolyte solutions exhibits surprisingly significant improvements in the recovery of oil from hydrocarbon-bearing formations. Without being limited to a particular theory, Applicant has recognized and appreciated that the dispersion of highly surface and mechanically active nanobubbles can be made even more efficacious by the integration and/or infusion of the nanobubbles into ECA solutions described herein.

The combination of particular ECA solutions with undissolved nanobubbles provide at least the following oil recovery related properties: (i) lower surface/interfacial tension; (ii) improved diffusion into porous media; (iii) improved disjoining pressure (e.g., a wedge effect for spontaneous mechanical lifting of oily materials from planar or porous surfaces); (iv) lowering the drag coefficient by flowing nanogas dispersions attracted to the formation surface instead of flowing over the higher drag coefficient surface of the subterranean formation; and (v) enhanced fragmentation (e.g., breaking oil droplets into finer droplets to improve recovery from porous and naturally fractured reservoir rocks). Nanobubbles infused in catholyte solutions remain on surfaces of the fragmented oil (i.e., persistence) to allow them to be more easily flowed within and from porous or fractured oil-bearing rock as well as help provide some lubricity of said admixture thereby increasing flow efficiency through wellbore production tubulars or pipelines to storage tanks and processing facilities. Additionally, Applicant has recognized and appreciated that the disclosed nanogas dispersions facilitate the separation of oil and water mixtures, thereby improving the efficiency of the release of oil adhered onto and within solid substrates or crude oil from particle-stabilized emulsions with water or brines as they may exist in storage tanks.

As used herein, the term "nanogas" refers to individual gas molecules or groups or clusters of gas molecules where the size of the individual gas molecules or groups or clusters of gas molecules is less than 500 nm.

As used herein, the term "dispersion" refers to a liquid (or gas) that can include dissolved gases (or liquids) and includes non-dissolved particles such as gas-filled cavities or nanobubbles. In contrast to a dispersion, a solution is a liquid (or gas) including gases or other solutes that are dissolved.

As used herein, the term "nanobubble" refers to long-living gaseous-containing bubbles or cavities that are characterized by a particular size (e.g., defined by a diameter or width that is no more than 500 nm) and behavior (e.g., remain stable for a period of time in a suspended state in a surrounding medium). The nanobubbles remain stable in that they do not immediately pop, burst, dissolve, or otherwise breakdown or become modified. The term "nanobubble" can also be referred to as nanoscopic bubbles, ultrafine bubbles, or the like. In embodiments, the nanobubbles envisioned herein are preferably generated without cavitation or sonication. However, the nanobubbles can be generated with cavitation or sonication in other embodiments. It should be appreciated that the nanobubbles are not limited to the embodiments described herein.

As used herein, the term "effective amount" refers to an amount that is sufficient to effect a measurable difference as compared to when not including the same amount.

As used herein, the terms "hydrocarbon," "crude," or "oil" may be used interchangeably to refer to carbonaceous material originating from subterranean sources as well as synthetic products.

As used herein, the term "brine" refers to any liquid that may be pumped into a subterranean formation and may include, but is not limited to, surface water, water recovered from a production wellbore, sea water, produced formation brine, formation brine, fresh water, produced water, water, saltwater, synthetic brine, synthetic seawater brine, or any combination thereof.

As used herein, the term "functionalized" refers to a chemical and/or physical modification using one or more compounds, one or more molecules, one or more polymers, and the like. For example, all of part of the surfaces of the nanobubbles described herein can be modified or functionalized by grafting, coating, encapsulating, or otherwise attaching some compound or molecule to the surface. In embodiments, the nanobubbles of the present disclosure may be provided as-produced, without any further surface modifications. In other embodiments, the nanobubbles may be functionalized (i.e., subjected to a chemical and/or physical surface modification).

Figure 2B:
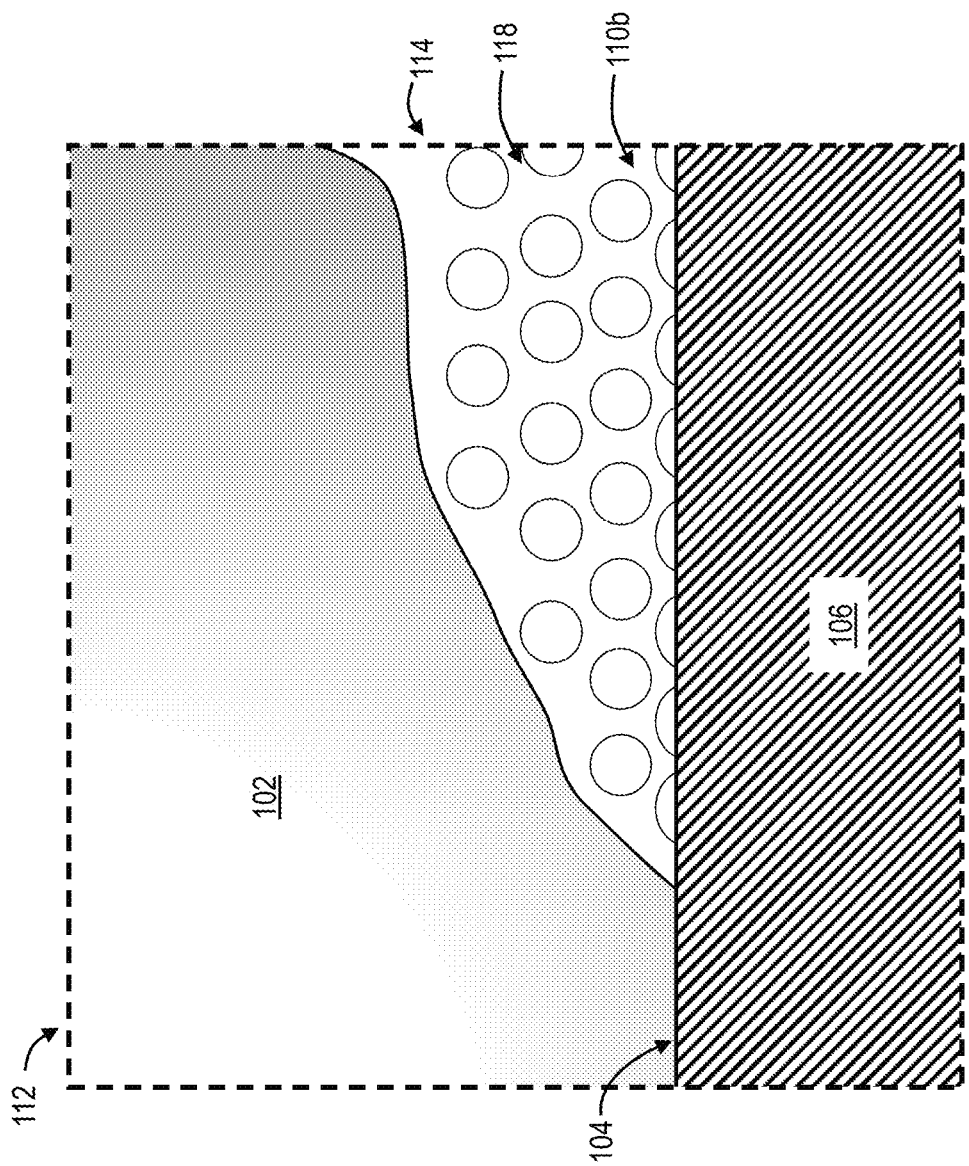
FIG. 2b illustrates an alternate version of the enlarged schematic representation shown in FIG. 2a according to aspects of the present disclosure.

Referring to the Figures, FIGS. 1a through 1c show the action of a nanogas dispersion 100 displacing a hydrocarbon droplet or material 102 from a surface 104 of a subterranean formation 106. FIGS. 2a and 2b shows a close up of portion 112 in FIG. 1B. The following should be appreciated in view of FIGS. 1a, 1b, 1c, 2a, and 2b. Nanogas dispersion 100 comprises a plurality of gas-filled cavities or nanobubbles 110 and an electrochemically activated ("ECA") aqueous solution 118. The nanobubbles 110 are dispersed or distributed within the ECA aqueous solution 118. The ECA solution 118 comprises an electrolyte and water.

In preferred embodiments, the nanobubbles 110 have a uniform spherical or substantially uniform spherical shape, which enables them to enter the interstitial space between a hydrocarbon droplet 102 and a surface 104 of a subterranean formation 106. The spherical or substantially spherical shape also enables the nanobubbles 110 to enter pores defined by the subterranean formation 106. In an embodiment, each cavity or nanobubble is defined by the following average bubble volume equation:

$$\pi h^2\left(r - \frac{h}{3}\right),$$

where h is the height of the gas-filled cavity and r is the radius of the gas-filled cavity. Additionally, the nanobubbles 110 have a uniform electron surface charge, which prevents coalescence of the nanobubbles 110 in the nanogas dispersion 100. In additional embodiments, the nanobubbles 110 have a non-spherical shape.

The nanobubbles 110 of the nanogas dispersion 100 are formed from or consist essentially of a single gas, or may include different nanobubbles formed from or consisting essentially of a combination of different gases. For example, in particular embodiments, the nanogas dispersion 100 may include a plurality of nanobubbles 110 formed from nitrogen, oxygen, carbon dioxide, methane, and the like or combinations thereof. Individual nanobubbles 110 can include a single gas or a combination of gasses. In embodiments, the nanobubbles can comprise a combination of nanobubbles including a single gas and nanobubbles including two or more gasses. In further embodiments, the nanogas dispersion 100 may include a plurality of nanobubbles 110 formed from two or more such gases. In embodiments containing at least a plurality of nanobubbles formed from a first gas and a plurality of nanobubbles formed from a second gas, the molar ratio of the first gas to the second gas may be from about 99:1 to about 1:99, including about 99:1, 90:1, 80:1, 70:1, 60:1, 50:1, 40:1, 30:1, 20:1, 10:1, 1:1, 1:10, 1:20, 1:30, 1:40, 1:50, 1:60, 1:70, 1:80, 1:90, and 1:99. Preferred molar ratios include about 18:82, 21:79, 28:72, 30:70, 32:68, 35:65, 40:60, 42:58, and 50:50. Other particularly relevant molar ratios can be selected from 50:50; 60:40; 70:30; and 80:20. Additionally, the nanogas dispersion 100 can be saturated with nanobubbles 110 or may be supersaturated with nanobubbles 110.

In particular embodiments, the more nanobubbles that are stably dispersed in the nanogas dispersion increases the tensile strength of each nanobubble. In other words, where the nanogas dispersion 100 has higher levels of nanobubbles 110, the tensile strength of the nanobubbles 110 is increased. In embodiments, the nanogas dispersion 100 with nanobubbles 110 increases the tensile strength of the nanobubbles 110 almost twenty-fold to 1.3 $N^{-1}$ for 150 nm bubbles. The increased tensile strength of the nanobubbles 110 minimizes the surface area of the nanobubbles 110, and hence the volume. This phenomena causes a corresponding increase in electron charge density. This phenomenon has been confirmed using Freeze Fracturing Transmission Electron Microscopy.

In particular embodiments, the nanobubbles 110 may have an average diameter of about 500 nm or less, or less than about 375 nm, or less than about 200 nm, or less than about 100 nm. In further embodiments, the nanobubbles 110 may have a diameter of about 20 nm to about 500 nm, or about 20 nm to about 30 nm, or about 30 nm to about 40 nm, or about 40 nm to about 50 nm, or about 50 nm to about 100 nm, or about 100 nm to about 150 nm, or about 150 nm to about 200 nm, or about 200 nm to about 250 nm, or about 250 nm to about 300 nm, or about 300 nm to about 350 nm, or about 350 nm to about 400 nm, or about 400 nm to about 450 nm, or about 450 nm to about 500 nm, including any combination of such endpoints. In preferred embodiments, the nanogas dispersion 100 does not include any microbubbles, including gas-filled cavities with an average diameter of greater than 500 nm. Because the nanobubbles 110 are so small, they are held in suspension in the fluids, reducing the surface tension of the fluid. Further, because of their size, pressures and hardness, they are colloidal and therefore exhibit movement via the mechanism of Brownian Motion. Such Brownian Motion refers to the random motion or oscillation of particles suspended in a medium.

There are a variety of methods for producing nanobubbles 110. The nanobubbles 110 may be formed in or by a nanobubble generator, one example of which is provided in U.S. Pat. No. 9,586,186 entitled "Machine and Process for Providing a Pressurized Liquid Stream with Dissolved Gas," which is incorporated by reference to its entirety. The nanobubbles 110 can then be infused into an ECA solution 118, such as, a suitable ECA brine solution described herein. Solution 118 comprises an electrolyte and water that have been electrolyzed. In embodiments, the nanogas dispersion is a homogeneous mixture of nanobubbles 110 (e.g., nanobubbles) and the ECA solution. As used herein, the term "homogenous" means that the nanobubbles are evenly or uniformly distributed throughout the nanogas dispersion and appear as a suspended "particulate" in the liquid solution. It should be appreciated that the nanobubbles 110 may also be formed in or by a nanobubble generator having a porous ceramic structure, a gas supply system, and a liquid supply system, where the gas supply system is configured to supply gas under pressure to a first surface of the porous ceramic structure so that the gas passes through the ceramic structure and emerges through a second surface of the structure, and where the liquid supply system is configured to supply liquid under pressure as a stream which flows over the second surface of the structure. An example nanobubble generator having a porous ceramic structure is available from Moleaer Inc. of Carson, California. Additional example nanobubble generators are described below yet are not intended to limit the present invention described herein.

Another example nanobubble generator (available from EBED Holdings Inc. in Ontario, Canada and as described in U.S. Pat. No. 10,814,290 B2) includes an inflow portion for receiving a single source liquid solution, a treatment portion for treating the single source liquid solution, and an outflow portion for releasing a treated liquid solution having nanobubbles. The treatment portion includes at least ten sequential shear surface planes separated by cavitation spaces. The treatment portion includes at least two equally sized disc-like elements mounted adjacent to each other on a shaft extending axially through the housing for continuously treating the single source liquid solution when the liquid solution is within the treatment portion. The disc-like elements are separated by a distance, the width of each disc-like element is about more than one half the distance between two consecutive disc-like elements.

Another example nanobubble generator (available from Johokagaku Kenkyosyo Co. Ltd. in Kumamoto-shi, Japan and as described in U.S. Pat. No. 10,500,553 B2) produces fine-bubbles by resonance foaming and vacuum cavitation.

A further example nanobubble generator (available from Gaia USA, Inc. in British Columbia, Canada and as described in U.S. Pat. No. 10,953,375 B2) uses a unitary, single-piece structure to generate and mix ultra-fine gas bubbles into a high gas concentration aqueous solution.

Another example generator (as described in U.S. Pat. No. 6,209,855 B1) includes a casing having a gas inlet, a liquid inlet, a gas/liquid mixture outlet, a microporous membrane in the casing, a fluid pressure regulating means, and a low-liquid-turbulence-incurring, gas/liquid mixture conveying and delivering device connected to the gas/liquid mixture outlet. The membrane includes effective, gas liquid contacting, pore pathway diameters generally in the range of 0.01 to 5 μm and a side that is repellant to the liquid to be mixed. The membrane divides the casing interior into a liquid path, on the liquid repellant side, between the liquid inlet and gas/liquid mixture outlet, and a gas chamber from the gas inlet. The fluid pressure regulating means is connected to the casing to regulate the gas/liquid pressure relationship therein so that the gas pressure does not exceed the liquid pressure and pressurized liquid does not pass through the membrane micropores. The apparatus may further include a tank and a pump connected to deliver liquid to the liquid inlet, and the low-liquid-turbulence-incurring, gas/liquid mixture conveying and delivering device is connected to the tank to gently deliver gas/liquid mixture thereto.

In still a further example nanobubble generator (available from Nanobubble Solutions Limited, a business registered in the United Kingdom and as described in U.S. Pat. No. 8,919,747 B2), a bubble generation medium is formed from a carbon-based porous (ceramic) material and is disposed so as to be horizontal or below horizontal with respect to the direction of flow of the liquid in the channel. The device includes a compressor for delivering gas under pressure and a bubble generation medium for discharging the gas, which has been delivered under pressure, as super-micro bubbles into liquid.

Another example nanobubble generator (available from Kerfoot Technologies, Inc. of Mashpee, Massachusetts and as described in U.S. Pat. No. 8,678,354 B2) includes a gas source that feeds gas to a gas dryer from which a pulse pump delivers the dried gas to an inlet that is contained within a bubble chamber (i.e., a pressurized vessel). The generator further includes a microporous diffuser configured to receive liquid that originates from a liquid storage tank or barrel, and which is delivered to the diffuser via a second pulsed pump. The generator further includes a stirrer assembly disposed on the bottom of the bubble chamber, and the stirrer assembly is configured to agitate fluids in the bubble chamber and shear bubbles off of the microporous diffuser.

Another example nanobubble generator using an ultrasonic generator (as described in U.S. Pat. No. 8,137,703 B2) involves a microbubble generator, a vessel, an ultrasonic generator, an intake, and an outlet. An aqueous solution having an electric conductivity of 22.3 mS/cm or more mixed with iron, manganese, calcium, sodium, magnesium ions and other mineral electrolyte ions is brought into the microbubble generator through the intake from the vessel. The voltage can be 2000 for ozone-containing microbubbles having a diameter of 10-50 μm. The aqueous solution, which is introduced through the intake, is mixed with a gas, which is injected to the microbubble generator, to produce microbubbles. The microbubbles can then be sent to the vessel through the outlet. Using the ultrasonic generator, ultrasonic waves, having frequencies of 20 kHz to 1 MHz, are applied to the aqueous solution containing ozone microbubbles in the vessel to shrink the microbubbles.

In particular embodiments, the ECA solution 118 is either a catholyte (i.e., alkaline electrolyzed water) or an anolyte (i.e., acidic or neutral electrolyzed water). For example, a catholyte ECA solution 118 may comprise a solution of sodium hydroxide, potassium hydroxide, other ECA-derived bases, or combinations thereof. ECA-derived bases may be derived from ECA and saltwater using sodium chloride (NaCl), potassium chloride (KCl), potassium carbonate ($K_2CO_3$), monovalent, divalent, and polyvalent salts, and the like. In other embodiments, the ECA solution 118 is an anolyte solution, which is typically used for bacterial mitigation but may be used (as described herein) in subterranean formations or surface facilities to reduce or eliminate $H_2S$ caused sulfate reducing bacteria. An anolyte ECA solution 118 may comprise a solution of hypochlorous acid and/or other hydroxy radical blends. In other words, the ECA solution 118 may comprise water and an electrolyte that is one or more of sodium hydroxide, potassium hydroxide, hypochlorous acid, etc., or combinations thereof, wherein the ECA solution 118 has been electrolyzed.

In embodiments, a precursor solution containing an electrolyte or a salt compound is subjected to an electrolytic process of electrochemical activation to form an ECA solution. As used herein, the term "electrochemical activation" refers to a process of temporarily modifying the properties of water by passing a salt brine through an electrolytic cell. The cell can include a membrane that separates the anolyte and catholyte, thereby preventing reduction of the oxidizing species at the cathode. In particular embodiments, the electrolyte or salt compound in the precursor solution may be, for example and without limitation, NaCl, KCl, $K_2CO_3$, and the like, or combinations thereof, which is then subjected to electrochemical activation to form an ECA solution containing hypochlorous acid (HOCl), potassium hydroxide (KOH), sodium hydroxide (NaOH), and other electrolyzed acids or bases.

In some embodiments, an anolyte ECA solution (e.g., a 250 ppm HOCl solution) may act as a sanitizer or bacterial control agent. One such example system and method are described in U.S. Pat. No. 10,885,497 entitled "Material Tracking System," which is incorporated by reference in its entirety.

Alternatively, a solution of catholyte can be produced as a byproduct of an electrolytic process involving a precursor solution containing NaCl, $K_2CO_3$, and/or KCl. Still other ECA solutions may include negatively charged electrolyzed water. For example, in embodiments where the active ingredient in catholyte is NaOH, KOH, or $K_2CO_3$, the sodium or potassium ion in an anolyte chamber crosses a membrane to contact a cathode (i.e., a negatively charged electrode) in a cathode chamber. The pH of the catholyte ECA solution may be between about 9 and about 13, including about 9, about 9.5, about 10, about 10.5, about 11, about 11.5, about 12, about 12.5, and about 13. The high pH of the catholyte ECA solution helps stabilize the nanobubbles in the dispersions described herein.

As discussed above, a catholyte ECA solution 118 may be generated by electrolyzing a solution of an electrolyte (e.g., NaOH) and water, and is not a standard chemical solution generated by mixing the electrolyte (e.g., NaOH) with water to reach an equivalent electrolyte concentration (e.g., ppm). As a result of the generation of the catholyte ECA solution, it is believed that a unique membrane is formed (e.g., clathrates) that facilitates the unique arrangement of charged (i.e., ionized) water molecules. Without being limited by theory, it is believed that the structural changes (i.e., water molecule clusters) that occur in the ECA solutions as part of a nanogas dispersion together with the surface chemistry benefits derived from unique electrolyzed brines aid in oil removal.

The water in the precursor solution and/or the resulting ECA solution can be, for example and without limitation, distilled water, deionized-water (i.e., DI water), ground water, municipal water, collected water (i.e., water that has been used in the oil industry for the hydraulic fracturing of subterranean formations), flowback water, produced water (i.e., water coming naturally from a formation that contains oil or solids), recycled water (i.e., collected or produced water which has been processed to remove oil and solids), reclaimed water (i.e., water coming from a reclamation plant), a nanobubble dispersion, or the like. As used herein, the term "nanobubble dispersion" refers to a solution with nanobubbles dispersed within it before creating the catholyte or anolyte, for example. In an embodiment using a nanobubble dispersion, the produced water that is recycled from the well could still include nanobubbles which were previously introduced into the oil well. Thereafter, the produced water with nanobubbles can be used to create the resulting catholyte ECA solution. In example embodiments, additional nanobubbles can be added to the produced water with nanobubbles using a nanobubble generator to reach a desired concentration in the nanogas dispersion. As used herein, the term "nanobubble dispersion" can also refer to a water brine with nanobubbles dispersed within it or any suitable alternative.

In specific embodiments, the concentration of the electrolyte in the precursor solution and/or the ECA solution may be from about 10 ppm to about 10,000 ppm, including preferred concentrations from about 100 ppm to about 600 ppm, from about 600 ppm to about 900 ppm, and from about 900 ppm to about 1200 ppm. In some embodiments, the concentration is approximately 800 ppm.

The ECA solution 118 may have a positive or a negative oxidation reduction potential ("ORP"), which is a measurement indicating the degree to which a substance is capable of oxidizing or reducing another substance. An ECA solution having a negative ORP helps stabilize and retain soils, fine particulates, and oils. The negative ORP also facilitates the transportation of such soils, fine particulates, and oils through and out of porous media. For example, in some embodiments, the ECA solution comprising electrolyzed alkaline water may have an ORP of less than about −100 mV, less than about −200 mV, less than about −300 mV, less than about −400 mV, less than about −500 mV, less than about −600 mV, less than about −700 mV, less than about −800 mV, or less than about −900 mV. Applicant has recognized and appreciated that the negative ORP of an ECA solution comprising electrolyzed alkaline water may be particularly beneficial for stabilizing and retaining soils, fine particulates and oils, as well as allowing their transport through and out of porous media. Applicant has further recognized and appreciated that the surface tension is also significantly lower with ECA produced catholyte than chemically blended caustic soda (NaOH). Non-electrolyzed or conventional chemically mixed NaOH is characterized by a positive ORP.

In further embodiments, the ECA solution comprising acidic or neutral water may have an ORP of greater than about +100 mV, greater than about +200 mV, greater than about +300 mV, greater than about +400 mV, greater than about +500 mV, greater than about +500 mV, greater than about +600 mV, greater than about +700 mV, greater than about +800 mV, or greater than about +900 mV.

As shown in FIGS. 1a, 1b, and 1c, a hydrocarbon droplet 102 such as oil that adheres to a surface 104 of a subterranean formation 106 can be separated from the surface 104 due to the mechanisms described herein. In FIGS. 1a, 1b, and 1c, the formation 106 represents a solid, droplet 102 represents a gaseous, liquid, or other suitable hydrocarbon element adhered to the solid formation 106, and dispersion 100 represents a particulate-containing liquid surrounding both the droplet 102 and the formation 106. Each of FIGS. 1a, 1b, and 1c show a three-phase interface where the solid formation meets the hydrocarbon material and the dispersion. A contact angle (Θ) 108 is formed with the droplet 102 and the surface 104 of the formation 106. The contact angle (Θ) 108 can be defined by the following equation:

$$\cos^{-1}\left(\frac{h}{r}-1\right),$$

where h is the height of the droplet and r is the radius of the droplet. When nanogas dispersion 100 is introduced into an interstitial space within a subterranean formation 106 and interacts with the target compounds of droplet 102, the plurality of nanobubbles 110b (shown in FIGS. 2a and 2b) self-organize into a wedge-shape 114 along the surface 104, creating a disjoining pressure that displaces the target material (e.g., hydrocarbons such as oil) 102. As illustrated in FIGS. 2a and 2b, the enlarged portion 112 of FIG. 1B shows that in a nanogas dispersion containing an ECA solution 118, a plurality of nanobubbles 110b form a wedge shape 114 along surface 104. As the wedge 114 of nanobubbles 110b continues to spread along the surface 104 toward the left sides of FIGS. 2a and 2b, the targeted material of droplet 102 is displaced from the surface 104. In other words, the contact line at the three-phase interface is displaced. As shown in the embodiments depicted in FIGS. 1c and 2b, a portion of the plurality of nanobubbles 110b can become adsorbed on surface 104 and the shape of these adsorbed nanobubbles can be modified or deformed to form a lenticular shape 116 after wedging the hydrocarbon from the surface 104 due to the higher adsorption of the nanobubbles 110b. In alternate embodiments as shown in FIG. 2a, the shapes of the plurality of nanobubbles 110b that contact the surface 104 while the contact line is being displaced do not become modified or deformed to form a lenticular shape. Instead, in these embodiments (FIG. 2a), the nanobubbles 110b can maintain their original shape (e.g. spherical) due to their tensile strength and the nanobubbles 110b form a persistence layer of nanobubbles 110b with greater tensile strength similar to ball bearings on the surface 104. This persistence layer allows fluids to flow at a lower pressure especially when in a confined space (e.g., a tube, pipe, and/or porous media).

Figure 3:
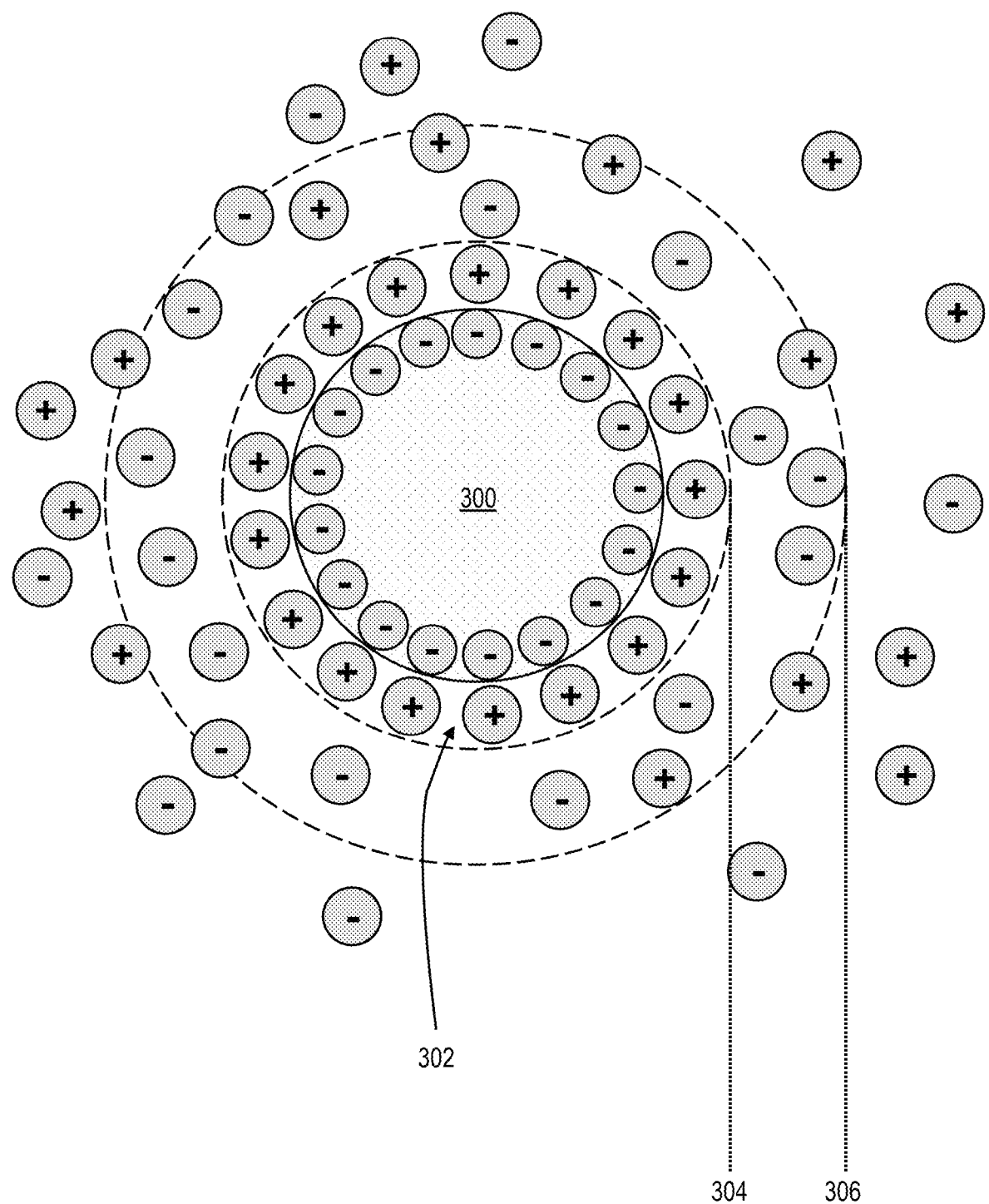
FIG. 3 illustrates the charge distributions surrounding an exemplary nanobubble according to aspects of the present disclosure.

With reference to FIG. 3, the nanobubbles 110 comprise individual nanobubbles such as nanobubble or cavity 300. A single gas-filled cavity 300 or nanobubble may include multiple gasses (e.g., air, field (i.e., mixed) gas, or oxygen and ozone). Nanobubble 300 has a uniform charge distribution, which aids in its ability to displace oil deposits from subterranean formations (e.g., the targeted material of droplet 102 from the surface(s) 104 of the formation 106 shown in FIGS. 1a through 1c). When immersed in a solution containing electrolytes, such as ECA solution 118, the nanobubbles exhibit a surface charge that increases surface potential. Due to the presence of hundreds of billions of nanobubbles dispersed within the solution 118, the ionic charge (i.e., the charge potential) and electro potential of the nanogas dispersion are increased. The evenly distributed charge on the nanobubbles pulls tiny oil droplets away from the oil-in-water emulsion, demulsifying the oil-in-water emulsion. As a result of the increased surface potential, each nanobubble 300 becomes surrounded by a cloud of counter-ions 302, which extends from the surface of the nanobubble 300 into the solution 118 and may result in separation between individual nanobubbles 300. This increased surface potential enables greater adsorption thereby attracting the nanobubbles to the surface (e.g., surface 104).

Because subterranean formations such as soil and rocks consist of a wide range of capillaries, capillary flow (i.e., wicking) can occur between closely spaced surfaces. While water is usually static next to hydrophilic surfaces, water will slip at hydrophobic surfaces, with the slip length varying based on the surface hydrophobicity, surface roughness, shear rate, and other factors. However, the nanobubbles in the nanogas dispersion are more adsorptive than hydrocarbons as well as water when compared to the formation surfaces due to the increased surface free energy, thereby enabling the nanobubbles to stick to the surface 104 and displace targeted hydrocarbon materials 102. The electric potential on the external boundary of the Stern layer 304 versus the nanogas dispersion is known as the Stern potential.

Additionally, the uniform charge distribution of the nanobubble 300 increases the electrokinetic potential of the nanogas dispersion and decreases the viscosity and the zeta (ζ potential of the nanogas dispersion, thereby attracting polar molecules. The zeta potential of nanobubble 300 refers to the electrokinetic potential at a location 306 of the slipping plane relative to a point in the bulk fluid away from that interface (i.e., it is the difference in potential between the dispersion medium and the stationary layer of fluid attached to the nanobubble). The uniform electron charge on the nanobubbles has a higher adherence factor (e.g., zeta potential) inducing the spherical cavities to adhere to, for example, hydrocarbons, such as oil. As a result, the nanobubble 300 attracts oil droplets until enough of the droplets collect or congregate such that they are big enough to rise. When the oil rises, it carries the nanobubbles with it, which temporarily increases the American Petroleum Institute (API) gravity of the oil. The API gravity expresses the relative density of petroleum liquids to water. In other words, the API gravity measures the heaviness or lightness of a liquid petroleum. According to a standard scale, light crude oil is defined as having an API gravity greater than 31.1° API (less than 870 kg/m3), medium oil is defined as having an API gravity between 22.3° API and 31.1° API (870 to 920 kg/m3), heavy crude oil is defined as having an API gravity between 10.0° API and 22.3° API (920 to 1000 kg/m3), and extra heavy oil is defined as having an API gravity below 10.0° API (greater than 1000 kg/m3). The greater the API gravity, the less dense the material.

During processing of produced water (reclaimed water), Applicant observed an increase of up to approximately 22% in the API gravity. For example, from approximately 10° API gravity to approximately 12.2° API gravity. The heavier the oil, the greater the change. Viscosity also decreased significantly with a greater decrease in heavier oils. The Applicant also experienced a change of pour point from 117 degrees Fahrenheit of heavy crude to 78 degrees Fahrenheit due to using nanobubbles for separation.

Figure 4:
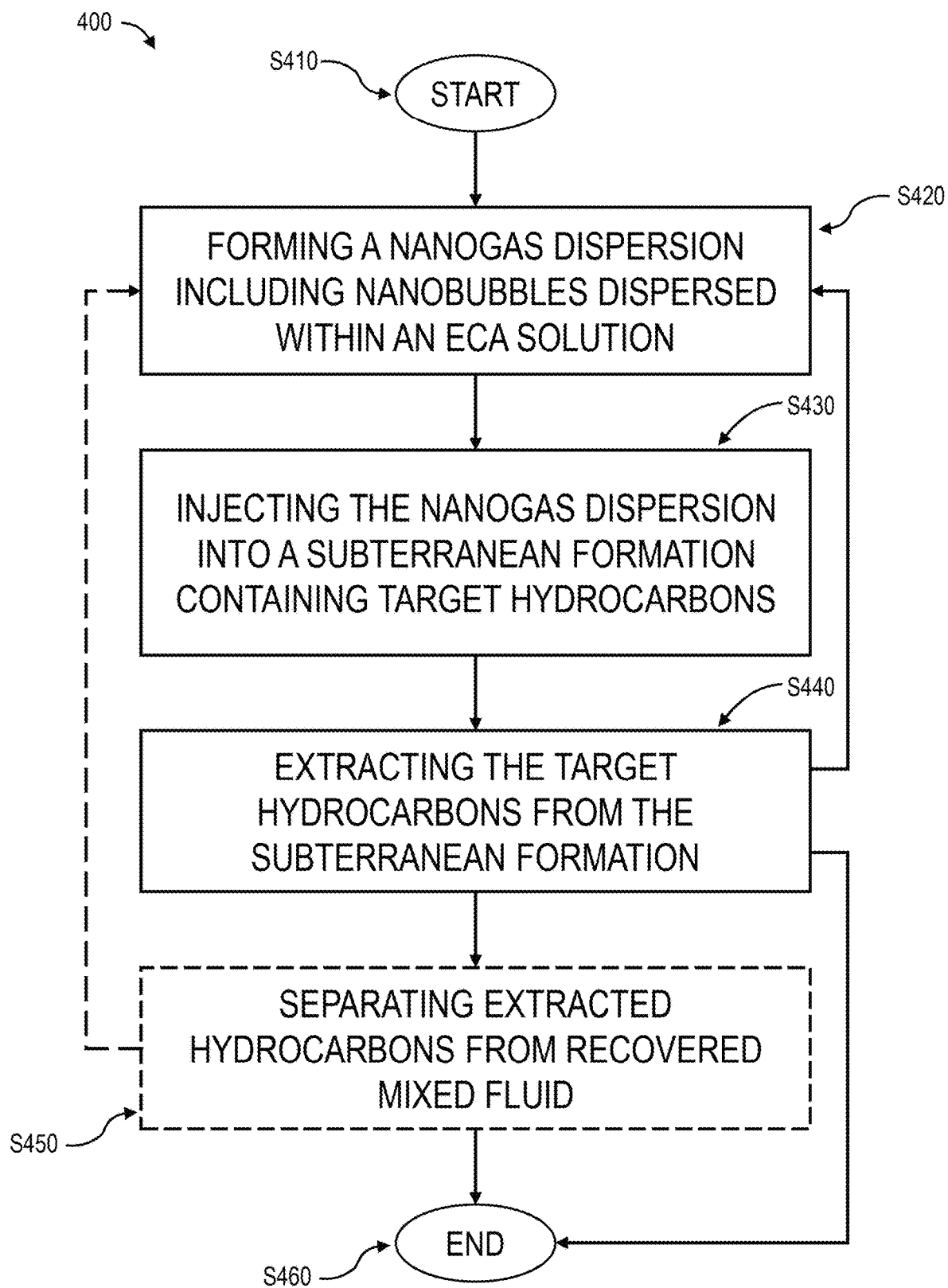
FIG. 4 is a flowchart illustrating an improved process for extracting target hydrocarbon deposits from a subterranean formation according to aspects of the present disclosure.

Turning to FIG. 4, an example method 400 for treating a subterranean formation is described. The method starts at step S410. At step S420, at least a first nanogas dispersion is formed wherein the nanogas dispersion includes one or more types of dispersions of nanobubbles within a catholyte or an anolyte ECA solution. In embodiments, the one or more nanogas dispersions are heated (e.g., to 120 or 150 degrees Fahrenheit or any suitable temperature). In other embodiments, the nanogas dispersions can be at ambient temperatures.

The step of forming a first nanogas dispersion can include feeding, with an ECA generator, a reservoir of catholyte or anolyte into a nanobubble generator. In embodiments, the ECA generator may produce catholyte or anolyte that flows directly into the nanobubble generator without a reservoir. The resulting nanogas dispersion may be stored in a surface reservoir or may be pumped directly downhole (i.e., within the subterranean formation). In embodiments, the nanobubble generator creates the nanobubbles before flowing into the ECA generator. The nanogas dispersion can be mixed with the catholyte or anolyte in various suitable ratios.

At step S430, an effective amount of one or more nanogas dispersions is pumped or injected into a subterranean formation that contains the target hydrocarbons (e.g., oil). In embodiments, the effective amount is added continuously. In other embodiments, the effective amount is added intermittently. In some embodiments, two or more different nanogas dispersions (e.g., a nitrogen gas-containing nanogas dispersion, a carbon dioxide gas-containing nanogas dispersion, a high concentration ECA solution, a low concentration ECA solution) may be co-injected or separately injected in the subterranean formation. The separate injection can include temporal or location distinctions (the first and second nanogas dispersions can be injected at the same time but at different locations and/or the first solution can be injected earlier than the other). In some embodiments, multiple injections of two or more solutions can occur with alternating solution compositions. In other embodiments, the first nanogas dispersion (e.g., a nitrogen gas nanogas dispersion) may be co-injected into the subterranean formation with a second nanogas dispersion (e.g., a carbon dioxide gas nanogas dispersion).

The injection of the nanogas dispersion into the subterranean formation at step S430 may include providing a pressurized admixture of the gas and water to an injection nozzle positioned within the subterranean formation. As such, the nanogas dispersion formed in step S420 according to the present disclosure can be manufactured, made, or generated downhole (i.e., within the subterranean formation) and is not produced above ground. For example, in one embodiment, a pressurized admixture of nitrogen and ECA solution can be provided to a nanogas dispersion generator (e.g., an injection nozzle) positioned within the subterranean formation wherein the nanogas dispersion generator/injection nozzle converts the pressurized admixture into a nanogas dispersion. In another embodiment, the pressurized admixture includes carbon dioxide. In yet another embodiment, the pressurized admixture includes a salt, preferably salt or salts that prevent the dissolution or damage of the formation and/or assist in the disruption of the hydrocarbon from the formation. In still further embodiments, the pressurized admixture may include fresh water that is substantially free of salts and/or contains no added salts.

In accordance with further aspects of the present disclosure, the method 400 can include conveying a pressurized admixture of a gas and ECA solution through a pipe from an above-ground proximal end of the pipe to a downhole terminal end of the pipe, wherein the terminal end is disposed in the subterranean formation. At the terminal end of the pipe, the pressurized admixture may then be subjected to a plurality of alternating flow regions in a tool in communication with the pipe and disposed at or near the terminal end of the pipe, wherein the flow regions each include a plurality of laminar flow regions and turbulent flow regions configured to produce a nanogas dispersion from the pressurized admixture. Then, the nanogas dispersion is formed in the tool (step S420), and injected (step S430) from the tool into the formation.

In step S440, a mixture comprising water is extracted from the subterranean formation to a surface-located device. In embodiments, the extracted mixture comprises produced fluids which can include one or more hydrocarbons, water, and optionally at least some of the nanogas dispersion.

It should be appreciated that steps S420, S430, and S440 can be repeated one or more times with different nanogas dispersions, different nanobubbles, and/or different ECA solutions in various embodiments. For example, embodiments can include at least two nanogas dispersions that can be introduced into a subterranean formation simultaneously, in sequence, or in an alternating fashion. In one example, a first nanogas dispersion can be provided at step S420 where the dispersion comprises an anolyte ECA solution and a plurality of nanobubbles (e.g., ozone gas-filled nanobubbles). Additionally, a second nanogas dispersion can be provided at step S420 where the dispersion comprises a catholyte ECA solution and a plurality of nanobubbles. The anolyte and catholyte nanogas dispersions can be provided at the same step or at separate steps. In an embodiment, an effective amount of the first nanogas dispersion comprising the anolyte ECA solution and the ozone gas-filled nanobubbles can be introduced or pumped into a subterranean formation at step S430 to perform bacterial mitigation. Following a period of time during which the bacterial mitigation is carried out, at step S440 a first mixture comprising water and optionally hydrocarbon material and/or at least some of the anolyte ECA solution is extracted. After another period of time, an effective amount of the second nanogas dispersion comprising the catholyte ECA solution and nanobubbles can be introduced or pumped into the subterranean formation at step S430 to perform the variety of oil-recovery related functions. Following another period of time during which the oil-recovery related functions are carried out, at step S440 a second mixture comprising water and optionally hydrocarbon material and/or at least some of the catholyte ECA solution is extracted. While the goal of injecting a nanogas dispersion with anolyte is to kill off bacteria in the subterranean formation, the nanobubble dispersion itself may (or may not) bring back hydrocarbon material at step S440 with the first mixture. Regarding the ozone gas-filled cavities, in embodiments the ozone gas is in a constant shift between oxygen and ozone; hence such cavities can comprise a gas mixture of oxygen and ozone. Of course it should further be appreciated that the nanogas dispersions can be applied to the formation any number of times and in any order. It should further be appreciated that other steps or processes can occur in between the application of different nanogas dispersions, different nanobubbles, and/or different ECA solutions. In embodiments, a cleansing or neutralizing step can occur between applying the first and second nanogas dispersions. In other embodiments, other chemicals such as surfactants could be introduced along with or as part of the nanogas dispersion.

In embodiments, the mixture that is extracted from the subterranean formation further comprises a hydrocarbon. The hydrocarbon may be a crude oil. In some embodiments, the hydrocarbon is a heavy crude oil, where the isolated oil has an API gravity ranging from about 8° to about 25°. In other embodiments, the isolated oil has an API gravity ranging from about 8° to about 9°, from about 9° to about 10°, from about 10° to about 11°, from about 11° to about 12°, from about 12° to about 13°, from about 13° to about 14°, from about 14° to about 15°, from about 15° to about 16°, from about 16° to about 17°, from about 17° to about 18°, from about 18° to about 19°, from about 19° to about 20°, from about 20° to about 21°, from about 21° to about 22°, from about 22° to about 23°, from about 23° to about 24°, from about 24° to about 25°, and any combination of endpoints thereof. In other embodiments, the hydrocarbon is a medium and/or light crude oil. Additionally, the subterranean formation may be any oil reservoir, for example and without limitation, mixtures of oil and gas formations, shale formations, and oil sands formations.

As mentioned above, the mixture that is extracted from the subterranean formation further comprises a hydrocarbon in embodiments. In some embodiments, the extraction step S440 includes improving the apparent viscosity of the oil in the subterranean formation by effectively lowering it. In other words, the density and/or viscosity of the oil in the formation is changed to facilitate the movement of the oil in the formation. In particular embodiments, one or more of the density or the viscosity is decreased. Once the viscosity of the oil is decreased, the decreased apparent viscosity oil is carried to a wellbore (extraction point) at a lower pressure (e.g., 22% lower in one case) and removed from the subterranean formation. In specific embodiments, the extracted decreased apparent viscosity oil can have an API gravity above 10°, preferably above 23°, above 25°, above 27°, or above 30°. That is, the weight of the oil extracted from the subterranean formation, when measured without additional steps following the extraction, has an apparent API gravity that is preferably above 23°.

Notably, the extracted decreased apparent viscosity oil can be further processed to remove additional solids, gases, and water to provide a cleaner crude oil. This crude oil can have an API gravity that is less than 22°, that is the crude oil can be a heavy oil. In one instance, the heavy oil has an API gravity that is less than 22°, less than 20°, less than 18°, less than 16°, less than 14°, or less than 12°.

In other embodiments, the oil extracted in step S440 is an admixture of produced water (containing nanobubbles) and oil. The recovered oil with decreased apparent viscosity may include a concentration of one or more gases used to form a plurality of nanobubbles. In specific embodiments, when produced water is extracted from the wellbore with the decreased apparent viscosity oil, this mixture does not include an oil-in-water emulsion. That is, the addition of the nanogas dispersion suppresses or prevents the formation of one or more oil-in-water emulsions in the subterranean formation and decreases or prevents the collection of the oil-in-water emulsions from the wellbore.

At step S460, the method ends. However, in further embodiments, the method 400 may include step S450 of separating the target hydrocarbons from the nanogas dispersion in the mixture that is extracted in step S440. For example, the method 400 can include step S440 for collecting a mixture of the hydrocarbon and produced water from the subterranean formation, and step S450 for separating the hydrocarbon and the produced water. The process of separating the hydrocarbon and the produced water can include providing the mixture to a separation tank (e.g., a float tank) for a density based separation. In some embodiments, step S450 can include the addition of an additional nanogas dispersion to facilitate breaking an emulsion in the mixture and/or dewatering the produced water through chemical, mechanical, or thermal processes.

In still further embodiments, the method 400 may include recycling the nanogas dispersion by repeating steps S420 through S450 one or more times using the recovered nanogas dispersion (or a portion thereof). Alternatively, steps S420 through S450 may be repeated one or more times using different nanogas dispersions. For example, the subterranean formation may be charged first with a nitrogen gas-containing nanogas dispersion. That is, prior to or concurrent with extraction the subterranean formation may be charged with a nitrogen-nanogas dispersion. In another embodiment, the subterranean formation may be charged first with a carbon dioxide gas-containing nanogas dispersion. In still further embodiments, the subterranean formation may be charged with a nitrogen gas-containing nanogas dispersion and a carbon dioxide gas nanogas dispersion prior to extraction of the hydrocarbons.

As described herein, the method 400 of extracting the hydrocarbon target can be carried out during a secondary production phase (secondary recovery including producing well remediation) and/or during a tertiary production phase (Enhanced Oil Recovery "EOR"). Notably, during a tertiary production phase, the subterranean formation can be charged with the nanogas dispersion prior to or concurrent with standard EOR processes. In particular embodiments, the method 400 achieves at least about 30% oil recovery of the oil remaining in the reservoir, at least about 40% oil recovery of the remaining oil, at least about 50% oil recovery of the remaining oil, at least about 60% oil recovery of the remaining oil, at least about 70% oil recovery of the remaining oil, at least about 80% oil recovery of the remaining oil, at least about 90% oil recovery of the remaining oil, or at least 95% oil recovery of the remaining oil.

Figure 5:
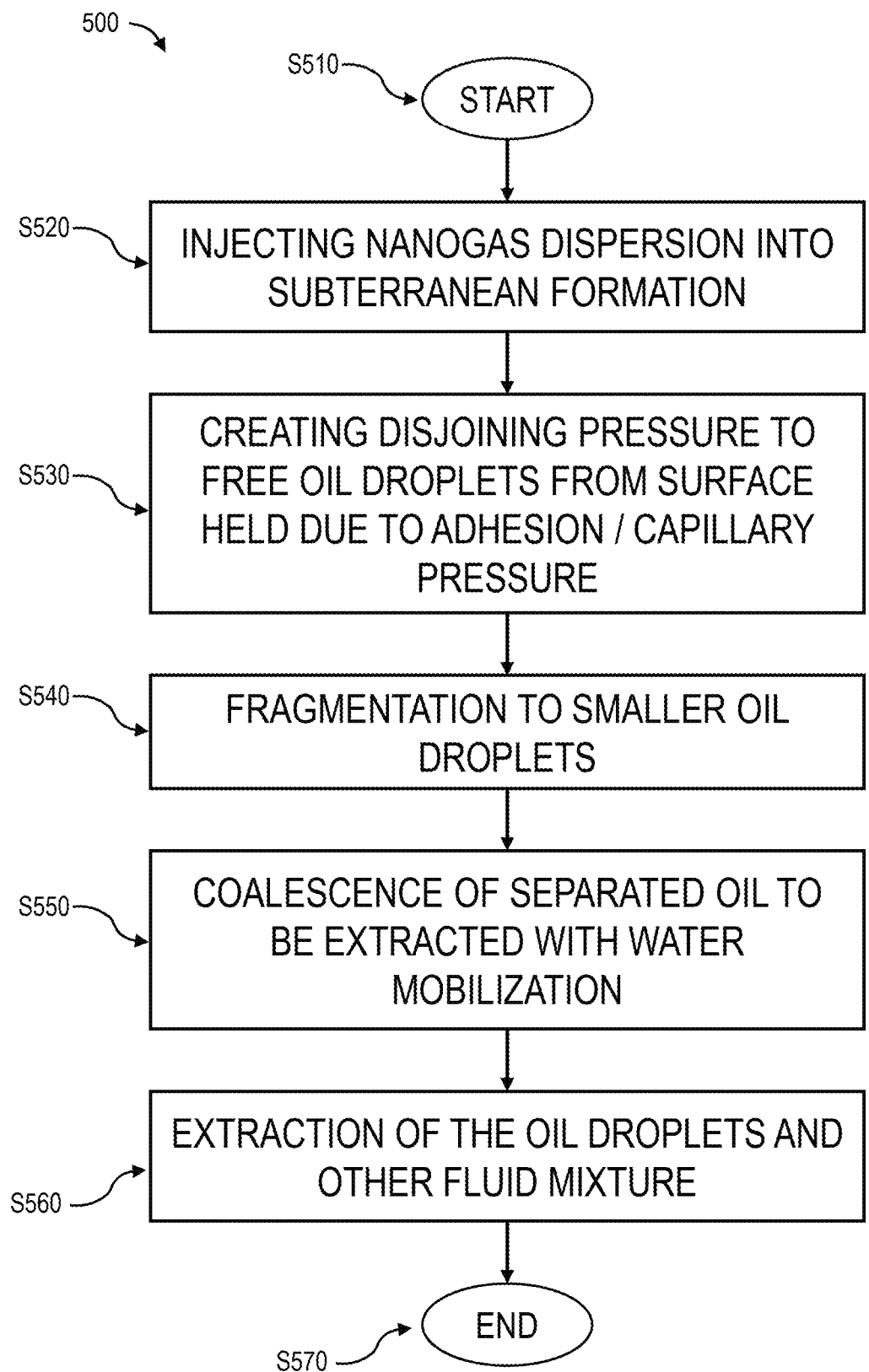
FIG. 5 is a flowchart illustrating a method of using an enhanced oil recovery system to extract oil from a subterranean formation according to aspects of the present disclosure.

Turning to FIG. 5, another method 500 of extracting a target hydrocarbon material from a subterranean formation is disclosed in accordance with further aspects of the present disclosure. The method starts at step S510. At step S520, a nanogas dispersion comprising an ECA solution and a plurality of nanobubbles or nanobubbles are injected into the subterranean formation, thereby entering the interstitial spaces within the formation where targeted material may be trapped. At step S530, the plurality of nanobubbles create a disjoining pressure within those interstitial spaces to free targeted material (e.g., hydrocarbons such as oil) that are being held to the surfaces of those interstitial spaces by adhesion and/or capillary action. At step S540, the nanogas dispersion acts to coalesce the targeted material after the material is freed from the surface(s) of the subterranean formation. As a result, the coalesced droplets begin to rise. Then, at step S550, the separated oil droplets coalesce. At step S560, the oil droplets and produced water are extracted from the subterranean formation. At step S570, the method ends.

Figure 6:
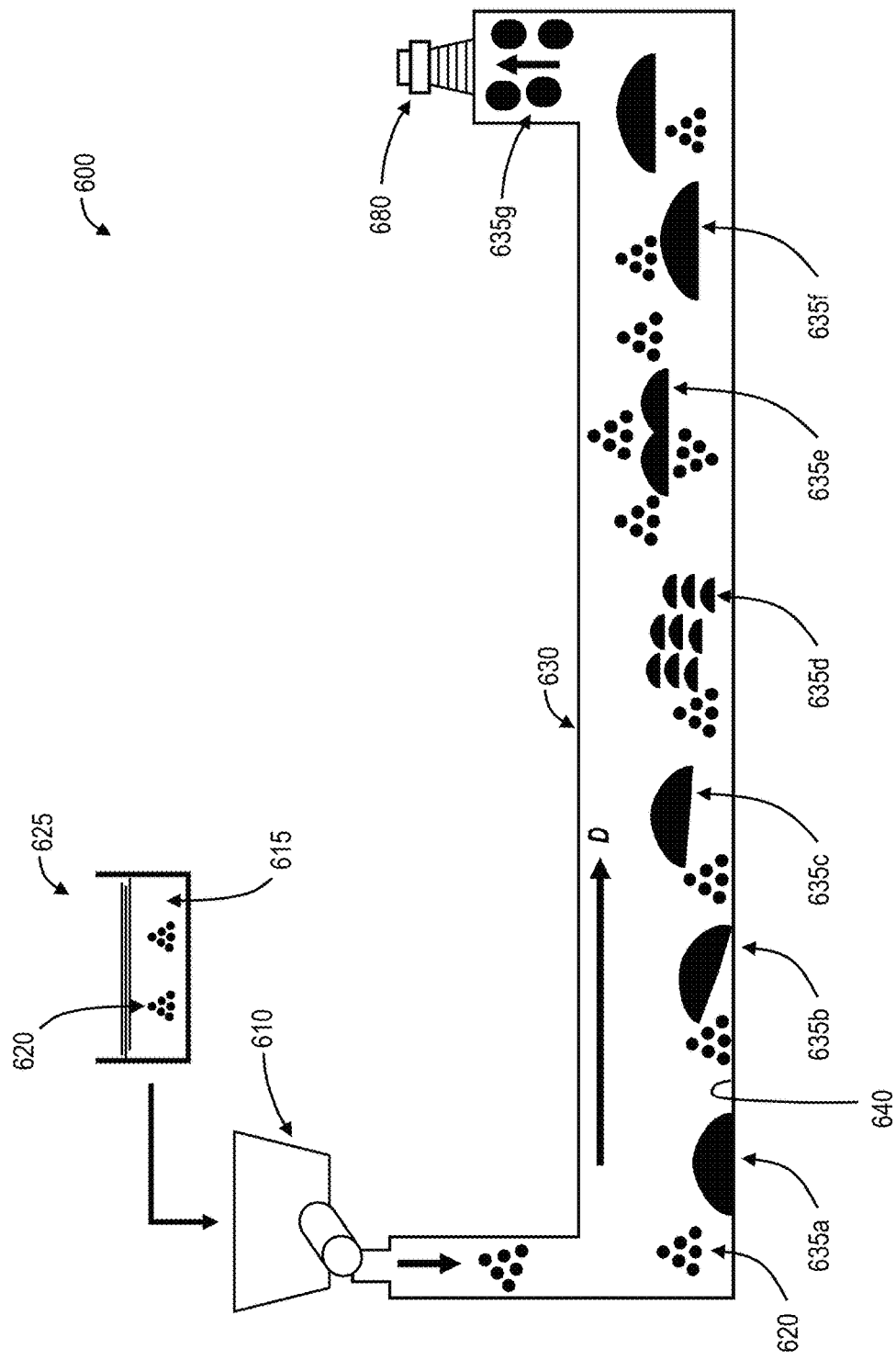
FIG. 6 is a representative illustration of a method of using an enhanced oil recovery system to extract oil from a subterranean formation according to aspects of the present disclosure.

With reference to FIG. 6, a method of using a system 600 for extracting target oil from a subterranean formation is illustrated according to still further aspects of the present disclosure. The system 600 includes an injection pump 610, a nanogas dispersion 615, a reservoir 625 configured to hold and/or generate the nanogas dispersion 615, and a surface-located recovery device 680 configured to collect extracted lower viscosity oil 635 and produced water. As described above, the nanogas dispersion 615 includes an ECA solution and a plurality of nanobubbles or nanobubbles 620. The injection pump 610 is configured to pump an effective amount of the nanogas dispersion 615 from the reservoir 625 into a pore throat of a subterranean formation 630. As used herein, the term "effective amount" refers to the amount of nanogas dispersion 615 needed to separate targeted materials (e.g., hydrocarbons like oil) from being trapped on or within surfaces within interstitial spaces of the subterranean formation 630. Once the formation is heavily saturated, Brownian motion of the nanobubbles within the nanogas dispersion 615 will decrease the surface tension of the oil on formation 635a, relieving interfacial and surface adhesion. The nanogas dispersion 615 travels through the subterranean formation 630 and into spaces where the target material 635 may be trapped at one or more surfaces 640 of the formation.

As shown in FIG. 6, a plurality of nanobubbles 620 within the nanogas dispersion 615 encounters a trapped droplet of target material 635a. As detailed above, the nanogas dispersion 615 acts as a wedge to lift the target material 635b away from the surface 640. During this phase, the flow of the nanogas dispersion including the Brownian Motion of the nanobubbles within the nanogas dispersion 615 within the formation 630 causes improved fluid flow through the formation and its pores. The nanobubbles within the pores reduce the capillary pressures in the pores thus releasing the oil from the pores. The water and colloidal nanobubbles enable the released oil to flow from the pores for removal from the formation with greater permeability and less resistance. The constant action and releasing the oil from the formation by the nanobubbles allow the oil in the formation to come out into the pore for extraction. When the droplet 635c is completely freed, the droplet 635c fragments within the nanogas dispersion 615 to form multiple smaller droplets 635d. The lighter and smaller droplets 635d flow through the subterranean formation 630 in an extraction direction D, and begin to coalesce back into a larger droplet 635e. The coalesced droplet 635f then pulls a plurality of the nanobubbles 620 along in the extraction direction D, and the targeted material 635g is then extracted along with a portion of the nanogas dispersion 615 using a surface-located device 680.

Figure 7:
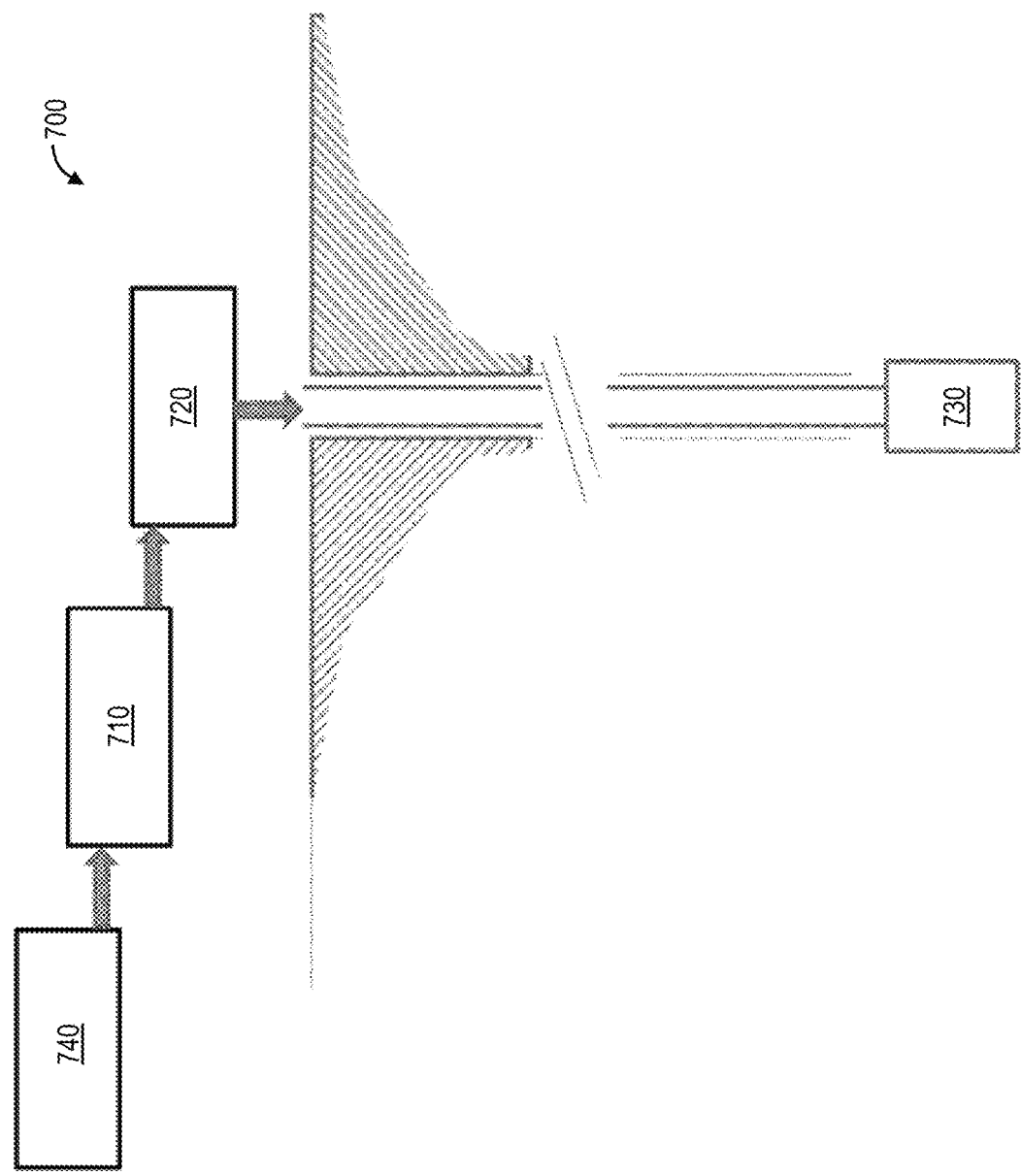
FIG. 7 is a depiction of a nanogas delivery system according to aspects of the present disclosure.

Turning to FIG. 7, a nanogas delivery system 700 is illustrated according to further aspects of the present disclosure. The nanogas delivery system 700 includes one or more fluid pumps 710, 720 in series. These pumps 710, 720 can be configured to supply a pressurized fluid stream (the pressurized admixture) to the nozzle assembly 730, which is configured to convert the pressurized admixture to a nanogas dispersion. The pumps 710, 720 can be in fluid communication with a pressurized vessel 740 that is configured to supply, at least, the fluid for the pressurized fluid stream (pressurized admixture), and preferably, further configured to provide the pressurized admixture of a gas and the fluid. The nanogas delivery system 700 can include a plurality of nozzle assemblies 730 connected in series or separated by exterior conduit(s) (as shown in FIG. 8).

In one embodiment, the nanogas delivery system 700 can be applied to a vertical borehole. In another embodiment, the nanogas delivery system 700 can be applied in a horizontal borehole.

Figure 8:
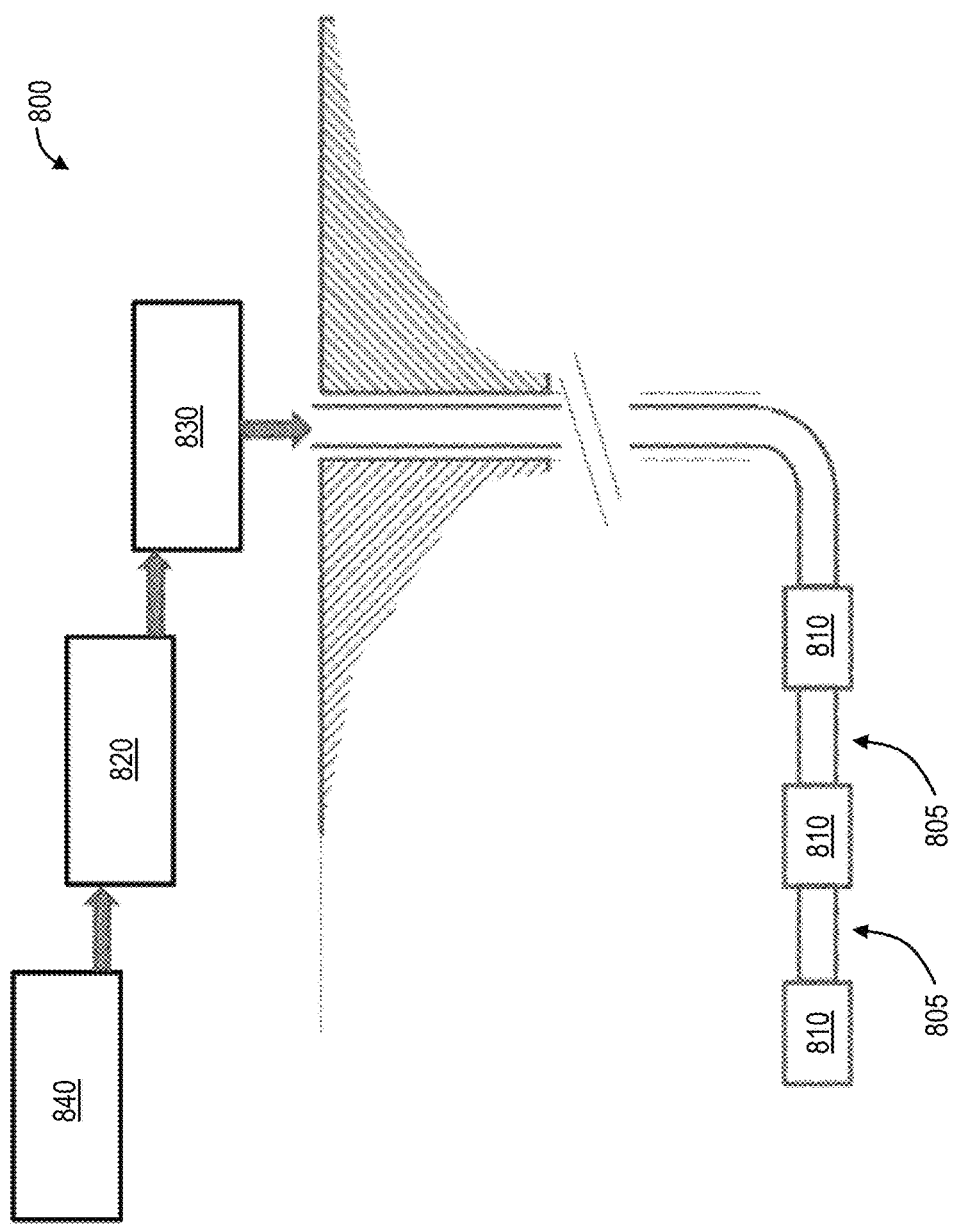
FIG. 8 is a depiction of a nanogas delivery system according to aspects of the present disclosure.

Turning to FIG. 8, a nanogas delivery system 800 is illustrated according to still further aspects of the present disclosure. The nanogas delivery system 800 can include a plurality of nozzle assemblies 810 spaced through the subterranean formation by a series of fluidly connected exterior conduits 805. The exterior conduits 805 can be configured to convey the pressurized fluid stream therethrough. The exterior conduits 805 may also be affixed to the nozzle assemblies 810 (e.g., threadably connected to the interior and/or exterior threads on the nozzle assemblies 810). However, other connections are envisioned, including flange connections, camlock couplings, welds, and brazings. As shown in FIG. 8, the system 800 includes nozzle assemblies 810 in fluid connection with one or more fluid pumps in series 820, 830 which are in fluid communication with a pressurized vessel 840 that is configured to supply, at least, the fluid for the pressurized fluid stream (pressurized admixture), and preferably, configured to provide the pressurized admixture of a gas and the fluid. The exterior conduits 805 can be of equal length (or absent) thereby configuring the nanogas delivery system 800 to provide a regularly spaced nanogas dispersion to the subterranean formation or the exterior conduits 805 can include a plurality of lengths thereby spacing the nozzle assemblies in different subterranean formation or in different sections of one subterranean formation (for example to provide differential pressure within a formation).

As described herein, the inventive systems and methods achieve complementary benefits that exceed what would be expected from (i) water alone, (ii) saltwater alone, (iii) nanobubbles alone, or (iv) catholyte alone. For example, Applicant has conducted Hele Shaw Cell and Amott Cell Core testing to show that catholyte and catholyte infused with nitrogen gas-containing nanobubbles, for example, can be used to extract 15 gravity crude oil from a 100 millidarcy (md) permeability reservoir, even a 200 md permeability reservoir, and a permeability reservoir that is greater than 200 md, or even 300 md. The testing and the results are described below.

Amott Cell Test 1: Brine and Catholyte

Applicant has saturated 100 millidarcy (md) cores that are 1.5-inches long by 1-inch wide with a 15 API gravity crude oil at an average of 4.6 cubic centimeters (cc) pore volume at room temperature. The plug samples were saturated using vacuum or capillary force. As used herein, the term "pore volume" refers to the total volume of pore space in a reservoir that is contemplated in a sweep in a well with a solution.

A control core was immersed in a solution of 2% potassium chloride (KCl) water and heated to 150 degrees Fahrenheit for more than 14 days and yielded approximately 1.4 cc of 15 gravity oil extracted from a 4.81 cc pore volume. Thus, the control generated a 31% oil recovery.

A first spontaneous imbibition test using an Amott Cell was performed by immersing a test core in a 50:50 blend of 2% potassium chloride (KCl) water and a 900 ppm catholyte solution. The immersed test core was heated to 150 degrees Fahrenheit for more than 14 days and yielded approximately 2.4 cc of extracted 15 gravity crude oil. Thus, the blend of KCl and catholyte generated approximately 54% oil and gas recovery.

A second spontaneous imbibition test using an Amott Cell was performed by immersing another test core in a blend of a 900 ppm catholyte solution and American Petroleum Institute (API) brine (aqueous 8 wt. % sodium chloride (NaCl) and 2 wt. % calcium chloride (CaCl2). The immersed test core was heated to 150 degrees Fahrenheit for more than 14 days and yielded approximately 1.8 cc of extracted 15 gravity crude oil. Thus, the blend of API Brine and catholyte generated approximately 39.4% oil recovery.

A third spontaneous imbibition test using an Amott Cell was performed by immersing another test core in a 900 ppm catholyte solution alone and heating the immersed test core to 150 degrees Fahrenheit for more than 14 days. This test core yielded approximately 2.9 cc of extracted 15 gravity crude oil. Thus, the solution made of 100% catholyte generated approximately 64.7% oil and gas recovery.

As shown above, Amott Cell tests at 150 degrees Fahrenheit for more than 14 days revealed enhanced oil and/or gas recovery by all brines. Additionally, all of the solutions that included a catholyte ECA solution extracted more oil at a faster rate than the solution of 2% potassium chloride (KCl) water. A majority of the oil recovery was observed after 7 days of being immersed. The solutions made of catholyte alone or mixtures of catholyte and 2% KCl or API brine can effectively extract more oil than simple brine mixtures (i.e., produced water) alone. Applicant has recognized and appreciated that such solutions made of catholyte alone or mixtures of catholyte and 2% KCl or API brine can be used in a waterflood application or any other suitable application.

Hele-Shaw Cell Test 1

Applicant also conducted a Hele-Shaw Cell test for the following test solutions: (i) a 50:50 blend of 2% potassium chloride (KCl) water and a 900 ppm catholyte solution; (ii) a blend of a 900 ppm catholyte solution and American Petroleum Institute (API) brine (aqueous 8 wt. % sodium chloride and 2 wt. % calcium chloride); and (iii) a 900 ppm catholyte solution alone.

Each Hele-Shaw Cell includes two 1-inch long by 2-inch wide glass plates or slides that form a slot (approximately 2 micron in width or thickness) therebetween to simulate an oil filled natural fracture geometry. Spacers or any suitable alternative can be used in between the slides to form the slot therebetween.

For the test, 1-3 ml samples of a 15 API gravity crude oil were applied to all three Hele-Shaw Cells. For example, the oil sample can be placed on one of the two pre-cleaned clear or etched microscope slides. The other pre-cleaned clear or etched microscope slide can be placed on top of the first slide containing the oil and the slides can be pressed together evenly until the oil spreads between the two slides. Any excess oil can be wiped from the edges of the chamber or slot with a suitable chemical wipe. The oil-containing slides can be secured together with two small neodymium magnets, either plastic wrapped or coated, or any suitable alternative.

The prepared cells with oil samples were immersed in or surrounded by the three tested solutions (e.g., 400 ml±100) in beakers. Of the three solutions tested at room temperature, the solution comprising the 900 ppm catholyte alone was observed to be most effective after approximately 6 hours. The catholyte only solution generated approximately 10-15% oil recovery after approximately 6 hours at room temperature. Approximately 25-30% oil recovery was observed after a 30 hour period. Thus, the catholyte only solution recovered more oil (via countercurrent imbibition) over a shorter time period than the 2% potassium chloride (KCl) water.

Amott Cell Test 2: Catholyte and Nanobubble N2 (Nitrogen) Infused Catholyte

Applicant saturated 1.5 long by 1 inch wide 100 millidarcy (md) cores with a 15 API gravity crude oil at approximately 4.57 cubic centimeters (cc) pore volume at room temperature.

A first spontaneous imbibition test using an Amott Cell was performed by immersing a test core in a solution comprising catholyte alone at room temperature for 7 days and yielded approximately 4.4 cc of gas and approximately 0.6 cc of extracted oil 15 gravity crude oil. Thus, the solution made of catholyte alone generated approximately 13.1% oil recovery at room temperature.

A second spontaneous imbibition test using an Amott Cell was performed by immersing another test core in a solution comprising a blend of nanobubbles N2 and catholyte (i.e., nanobubble N2 infused catholyte) at room temperature for 7 days and yielded no gas and approximately 0.7 cc of extracted oil 15 gravity crude oil. Thus, the nanobubble N2 infused catholyte generated approximately 15.3% oil recovery at room temperature.

A third spontaneous imbibition test using an Amott Cell was performed by immersing another test core in a solution comprising a blend of nanobubbles N2 and catholyte (i.e., nanobubble N2 infused catholyte). The test solution was mixed after manufacture and diluted 50%. Unlike the second test, in the third test, the nanobubble N2 infused catholyte was heated to 120 degrees Fahrenheit for 4 days and yielded approximately 2.5 cc of extracted oil 15 gravity crude oil. After 7 days at 120 degrees Fahrenheit, the nanobubble infused catholyte yielded approximately 3.0 cc of the total pore volume of available crude. Thus, the nanobubble infused catholyte generated approximately 65.6% oil recovery at 120 degrees Fahrenheit.

Hele-Shaw Test 2

Applicant also tested a nanobubble dispersion 10% versus a microemulsion additive blend of solvent, surfactant, alcohol, and water in a Hele-Shaw Cell test. For the test, Applicant applied samples of a 15 API gravity crude oil to first and second Hele-Shaw Cells. One cell with the oil was immersed in a nanogas dispersion comprising a catholyte solution and nanobubbles N2 and the other cell was immersed in the microemulsion additive blend. The cell with the nanogas dispersion revealed shockingly superior oil recovery to the cell with the microemulsion additive blend.

Applicant has recognized and appreciated that solutions made of catholyte alone or solutions of nanobubble infused catholyte can effectively extract more oil than other mixtures. Applicant has also recognized and appreciated that solutions made of anolyte can effectively reduce or mitigate bacteria better than other solutions.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also comprising more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily comprising at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Any patent applications, patents, and printed publications cited herein are incorporated herein by reference in their entireties, except for any definitions, subject matter disclaimers or disavowels, and except to the extent that the incorporated material is inconsistent with the express disclosure herein, in which case the language in this disclosure controls.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for treating a hydrocarbon-bearing formation using an enhanced system comprising a pump, the method comprising:
   providing a nanogas dispersion comprising a plurality of stable gas-filled cavities dispersed within an electrochemically activated ("ECA") aqueous solution, the ECA aqueous solution comprising an electrolyte and water; and
   introducing, via the pump of the enhanced system, an effective amount of the nanogas dispersion into the hydrocarbon-bearing formation, wherein the plurality of stable gas-filled cavities of the nanogas dispersion enter into an interstitial space defined as between a hydrocarbon and the hydrocarbon-bearing formation thereby reducing interfacial tension between the hydrocarbon and the hydrocarbon-bearing formation.

2. The method of claim 1, further comprising separating the hydrocarbon from the hydrocarbon-bearing formation and extracting, via a recovery device of the enhanced system, the hydrocarbon from the hydrocarbon-bearing formation.

3. The method of claim 1, further comprising generating the plurality of stable gas-filled cavities using a pressurized system including: (i) a microporous membrane, (ii) a cavitation system, (iii) a sonication system, or (iv) a pressurized system including a liquid-gas saturation device having a flow path.

4. The method of claim 1, wherein the plurality of stable gas-filled cavities comprises at least one of carbon dioxide gas-filled cavities, nitrogen gas-filled cavities, oxygen gas-filled cavities, ozone gas-filled cavities, air-filled cavities, field gas-filled cavities, and methane gas-filled cavities or combinations thereof.

5. The method of claim 1, wherein the plurality of stable gas-filled cavities have an average diameter of less than 500 nm.

6. The method of claim 1, wherein one or more of the plurality of stable gas-filled cavities is defined by a tensile strength of at least 1.3 $N^{-1}$ for cavities as small or smaller than 150 nm.

7. The method of claim 1, wherein the electrolyte is at least one of sodium chloride, potassium chloride, and potassium carbonate, and when electrochemically activated, the electrolyte becomes at least one of sodium hydroxide, potassium hydroxide, and hypochlorous acid.

8. The method of claim 1, wherein the ECA aqueous solution is a catholyte or an anolyte.

9. The method of claim 1, further comprising the nanogas dispersion forming a wedge of stable gas-filled cavities that creates a disjoining pressure that displaces the hydrocarbon from the hydrocarbon-bearing formation.

10. The method of claim 1, further comprising fragmenting the hydrocarbon into a plurality of smaller hydrocarbon droplets to reduce a viscosity of the hydrocarbon enabling the hydrocarbon to flow from the hydrocarbon-bearing formation.

* * * * *